(12) United States Patent
Barkehanai et al.

(10) Patent No.: US 12,429,857 B2
(45) Date of Patent: Sep. 30, 2025

(54) SHIFT CONFIGURATIONS FOR MANUFACTURING EXECUTION SYSTEMS

(71) Applicant: AVEVA SOFTWARE, LLC, Lake Forest, CA (US)

(72) Inventors: Jeffrey Kohen Barkehanai, Lake Forest, CA (US); Raghavendran Gobalakrishnan, Bangalore (IN)

(73) Assignee: Aveva Software, LLC, Lake Forest, CA (US)

( * ) Notice: Subject to any disclaimer, the term of this patent is extended or adjusted under 35 U.S.C. 154(b) by 428 days.

(21) Appl. No.: 18/116,122

(22) Filed: Mar. 1, 2023

(65) Prior Publication Data
US 2023/0280728 A1 Sep. 7, 2023

Related U.S. Application Data

(60) Provisional application No. 63/315,162, filed on Mar. 1, 2022.

(51) Int. Cl.
*G05B 19/418* (2006.01)

(52) U.S. Cl.
CPC ... *G05B 19/41865* (2013.01); *G05B 19/4183* (2013.01); *G05B 2219/23258* (2013.01); *G05B 2219/25419* (2013.01)

(58) Field of Classification Search
CPC .......... G05B 19/4183; G05B 19/41865; G05B 2219/232258; G05B 2219/25419
See application file for complete search history.

(56) References Cited

U.S. PATENT DOCUMENTS

| | | | | |
|---|---|---|---|---|
| 2020/0026263 | A1* | 1/2020 | Haberkern | H04L 41/5022 |
| 2023/0280728 | A1* | 9/2023 | Barkehanai | G05B 19/4183 |
| | | | | 700/100 |

* cited by examiner

*Primary Examiner* — Mark A Connolly
(74) *Attorney, Agent, or Firm* — Dergosits & Noah LLP; Todd A. Noah

(57) ABSTRACT

The disclosure describes a system for executing schedules in a manufacturing execution system (MES). In some embodiments, the system is configured to enable multiple shift patterns to be entered for a single entity. In some embodiments, the system is configured to prioritize the shift patterns based on an execution time. In some embodiments, the system includes one or more of a schedule pattern table, a schedule template, and an entity table, which are linked to each other to define parameters of one or more schedules. In some embodiments, the system is configured to automatically assign a time zone the time entered that matches the time zone where the entity associated with the schedule is located.

15 Claims, 31 Drawing Sheets

Shift Pattern

| Pattern Id | Name | Start Eff | End Eff | Recurring | Additive | Enabled |
|---|---|---|---|---|---|---|
| 1 | Start Shif Pattern | 2015-01-01 | Null | ☑ | ☐ | ☐ |
| 2 | Thanksgiving Sch | 2020-11-25 10:00:00 | 2020-11-30 06:00:00 | ☑ | ☐ | ☑ |
| 3 | Christmas Holidays | 2020-12-25 06:00:00 | 2020-01-04 06:00:00 | ☐ | ☐ | ☐ |
| 4 | Summer Inc Wends | 2020-04-01 06:00:00 | 2020-11-01 06:00:00 | ☑ | ☑ | ☑ |

Shift Schedule

| Pattern Id | Start Time | End Time | End Day Span | Shift id | Sunday | Monday | Tuesday | Wednesday | Thursday | Friday | Saturday |
|---|---|---|---|---|---|---|---|---|---|---|---|
| 1 | 6:00 | 14:00 | 0 | 1 | ☐ | ☑ | ☑ | ☑ | ☑ | ☑ | ☐ |
| 1 | 14:00 | 22:00 | 0 | 2 | ☐ | ☑ | ☑ | ☑ | ☑ | ☑ | ☐ |
| 1 | 22:00 | 6:00 | 1 | 3 | ☐ | ☑ | ☑ | ☑ | ☑ | ☑ | ☐ |
| 4 | 6:00 | 14:00 | 0 | 1 | ☑ | ☐ | ☐ | ☐ | ☐ | ☐ | ☑ |
| 4 | 14:00 | 22:00 | 0 | 2 | ☑ | ☐ | ☐ | ☐ | ☐ | ☐ | ☑ |
| 4 | 22:00 | 6:00 | 1 | 3 | ☑ | ☐ | ☐ | ☐ | ☐ | ☐ | ☑ |

Shift Pattern Ent Link

| Shift Sched Ent Id | End Id | Pattern Id |
|---|---|---|
| 1 (NY Plant) | 1 (NY Plant) | 1 |
| 2 (San Fran Plant) | 2 (San Fran Plant) | 1 |
| 1 (NY Plant) | 1 (NY Plant) | 4 |
| 2 (San Fran Plant) | 2 (San Fran Plant) | 2 |
| 1 (NY Plant) | 10 (Grinder) | 3 |
| 2 (San Fran Plant) | 20 (Sleever) | 3 |

FIG. 4

| Pattern ID | Pattern Name | Start Eff Local | End Eff Local | Recurring | Additive | Enabled | Comments |
|---|---|---|---|---|---|---|---|
| 1 | Starting Shift Pattern | 2015-01-01 | NULL | ☒ | ☐ | ☒ | |

Table Structure:

| Column Name | Data Type | Comments |
|---|---|---|
| Pattern ID | Integer (Auto Generated) | Identifies a unique pattern |
| Pattern Name | String80 (Required, Non-nullable) | Short Name identifying a unique pattern |
| Start Eff Local | Small Date Time (Required, Non-nullable) | Representing a date and time that will be used as entity's local time to determine when the pattern becomes effective. Since the shift schedules are checked and changed on minutely basis, datetime resolution will be up to minutes, seconds will not be stored. |
| End Eff Local | Small Date Time (Nullable) | When the value is non-null, it represents a date and time that will be used as entity's local time to determine when the pattern becomes obsolete. Datetime resolution will be up to minutes, seconds will not be stored. When the value is null, the shift schedule is perpetual. Note: A non-null value is required when the Boolean recurring flag is set to false |
| Recurring | Boolean (Required, Non-nullable) | Defaults to true. When True, the schedule is repeated weekly from the start time to the end time (if configured) or repeated perpetually. When False, the pattern is a one-off schedule. When this pattern is the most recent pattern, then the entities that are linked to this pattern will have their shifts set to 0 between the start and end times. There will not be any shift templates (since this is a one-off schedule) for this pattern, There will be no relation to the Additive flag when this flag when this is false |
| Additive | Boolean (Required, Non-nullable) | Defaults to false. Intended to overlay a schedule temporarily or for a short amount of time. When True, the regular schedule will be merged with this schedule for the days that are selected, the unselected (unchecked) days are ignored as they are expected to follow their original schedule. When False, indicates this pattern is a regular schedule. Defaults to true. |
| Enabled | Boolean (Required, Non-nullable) | Defaults to true. When True, the shift pattern and templates are used at runtime. When False, the shift pattern and templates are ignored at runtime |
| Comments | String 2000 Nullable | Optional. Any additional information that describes why the pattern was created |

FIG. 5

Usage when different combination of Boolean flags are selected

| Recurring | Additive | Comments |
|---|---|---|
| True | False | This is a recurring schedule that will be used every week when the pattern becomes effetive |
| True | True | The additive schedule will overlay override the recurring schedule for a period that may extend a shift duration during the additive schedule time. That is, the normal recurring shift pattern is still applied, and this additive pattern is overlaid on top of the existing pattern |
| False | False | This will be a one-off holiday schedule (considered as a O shift) for the fixed time between start_eff_local and end_eff_local |
| False | True | Not Applicable/Not allowed. For this configuration, the additive schedule becomes ambiguous when the start_eff_local and end_eff_local span more than a week, since the system may not know which week is applicable for this pattern. Therefore, this configuration is disallowed. |

FIG. 6

Priority of Shift Schedules to determine active shifts/patterns
Note: The most recent start effectivity date takes precedence over older start effectivity dates where more than one record exists with the same recurring and additive flags

| Priority (not an actual field in the table) | Recurring | Additive | Pattern / Shift Type (not an actual field in the table) | Comments |
|---|---|---|---|---|
| 1 | False | False | Side wide Holiday, Site wide Events, etc. | When the pattern of this type becomes effective, this type takes precedence over other types, since holiday, events, etc. will put the entity in the no shift (0 shift). |
| 2 | Not applicable to any patterns/templates. Exception is stored in the shift exc table | | | This exception is limited at the entity level (or a line entity and its descendants). Unrelated to a pattern, but the times configured in the exception is directly applied on the entity. Refer to schema structure above or refer to examples 5 and 6 in the document below. |
| 3 | True | True | Extended Shift Schedule | When this type of pattern becomes effective, this type takes precedence over regular shift schedules, since this type normally extends the regular shiftschedule. |
| 4 | True | False | Regular Shift Schedule | The pattern that has regular shift schedule will be the last priority to be followed |

FIG. 7

| Pattern Id | Start Day | Start Time | End Time | End Day Span | Shift Id |
|---|---|---|---|---|---|
| 1 | 2 (Mon) | 06:00 | 14:00 | 0 | 1 |
| 1 | 3 (Tue) | 06:00 | 14:00 | 0 | 1 |
| 1 | 4 (Wed) | 06:00 | 14:00 | 0 | 1 |
| 2 | 2 (Mon) | 06:00 | 14:00 | 0 | 1 |
| 2 | 2 (Mon) | 14:00 | 22:00 | 0 | 2 |
| 2 | 2 (Mon) | 22:00 | 06:00 (next day) | 1 | 3 |
| 2 | 3 (Tue) | 06:00 | 14:00 | 0 | 1 |
| 2 | 3 (Tue) | 14:00 | 22:00 | 0 | 2 |
| 2 | 3 (Tue) | 22:00 | 06:00 (next day) | 1 | 3 |

FIG. 8

| Shift Id | Sun | Mon | Tue | Wed | Thu | Fri | Sat |
|---|---|---|---|---|---|---|---|
| 1 | ☐ | ☒ | ☒ | ☒ | ☐ | ☐ | ☐ |
| 2 | ☐ | ☒ | ☒ | ☒ | ☒ | ☒ | ☐ |
| 3 | ☐ | ☒ | ☒ | ☒ | ☐ | ☐ | ☐ |

| Pattern id | Start Time | End Time | End Day Span | Shift Id |
|---|---|---|---|---|
| 1 | 06:00 | 14:00 | 0 | 1 |
| 2 | 14:00 | 22:00 | 0 | 2 |
| 2 | 22:00 | 06:00 (next day) | 1 | 3 |

FIG. 9

| Column Name | Data Type | Comments |
|---|---|---|
| Pattern ID | Integer | Reference back to the shift pattern table to determine when this shift template becomes effective and/or obsolete |
| Start Time | Time (0). Required, Non-Nullable | Represents the starting time on a weekday. Only the time component is stored. No seconds/milli-seconds are used. The schedules are expected to start at the top of a minute (not in the middle of a minute) |
| End Time | Time (0). Required, Non-Nullable | Represents the ending time on a weekday. Only the time component is stored. No seconds/milli-seconds are used. The schedules are expected to end at the top of a minute (not in the middle of a minute). The end time must be greater than the start time |
| End Day Span | Integer. Non-Nullable. defaults to 0 | Indicating the number of das from the Start Day Time to add to determine the ending weekday. Allowable values are between 0 to 7. |
| Shift id | Integer. Required, Non-Nullable | The ID of the shift that is related to this shift template |
| Sunday | Boolean. Required, Non-Nullable | When true, this shift starts on Sunday; otherwise, False |
| Monday | | When true, this shift starts on Monday; otherwise, False |
| Tuesday | | When true, this shift starts on Tuesday; otherwise, False |
| Wednesday | | When true, this shift starts on Wednesday; otherwise, False |
| Thursday | | When true, this shift starts on Thursday; otherwise, False |
| Friday | | When true, this shift starts on Friday; otherwise, False |
| Saturday | | When true, this shift starts on Saturday; otherwise, False |
| Break1_start | Existing fields and their datatypes | |
| Break1_end | | |
| Break2_start | | |
| Break2_end | | |
| Break3_start | | |
| Break3_end | | |

FIG. 10

| Shift Sched Ent Id | Ent Id | Pattern Id |
|---|---|---|
| 1 | 1 | 1 |
| 2 | 2 | 1 |
| 1 | 1 | 2 |
| 1 | 1 | 5 |

Table Structure:

| Column Name | DataType | Comments |
|---|---|---|
| Shift Sched Ent Id | Integer. Required Non Nullable | Identifies the entity ID that is being linked. *This will be the entity that can schedule shifts. The entities that do not schedule shifts are not allowed to be added as part of the linkage.* |
| Ent Id | Integer. Required Non Nullable | Identifies the entity ID to which the shift is applied. The shifts will be applied to this entity and to all the entities downstream to this entity |
| Pattern Id | Integer. Required, Non-nullable | Identifies the pattern ID that is being linked |

FIG. 11

Table Structure:

| Column Name | DataType | Comments |
|---|---|---|
| Ent Id<br>Shift Id<br>Shift Start Utc<br>Shift Start Local<br>Shift End Utc<br>Shift End Local | Existing fields and their datatypes | |
| Pattern Id | Integer. Nullable | Identifies the pattern ID that was used for this shift schedule |
| Shift Comments | String 2000 Nullable | When deriving the shift schedule from templates or exceptions, the runtime logic will copy the comments (if any) to this column identifying why this pattern/exception was used, for tracing purposes |
| Comments | String 2000 Nullable | Optional. Any additional information that user may want to update after the shift history record is added to this table. |
| Row_id | Exixting field | |

FIG. 12

Shift Pattern:
- Pattern ID is primary key, pattern name + start eff local is unique

| Pattern ID | Pattern Name | Start Eff Local | End Eff Local | Recurring | Additive | Enabled | Comments |
|---|---|---|---|---|---|---|---|
| 1 | Starting Shift Pattern | 2015-01-01 | NULL | ☒ | ☐ | ☒ | |

Shift Template: Only for repeated/recurring shift templates

| Pattern ID | Start Day | Start Time | End Time | End Day Span | Shift Id |
|---|---|---|---|---|---|
| 1 | 2 (Mon) | 06:00 | 14:00 | 0 | 1 |
| 1 | 3 (Tue) | 06:00 | 14:00 | 0 | 1 |
| 1 | 4 (Wed) | 06:00 | 14:00 | 0 | 1 |

Or Shift Template (as below)

| Pattern ID | Start Time | End Time | End Day Span | Shift Id | Sun | Mon | Tue | Wed | Thu | Fri | Sat |
|---|---|---|---|---|---|---|---|---|---|---|---|
| 1 | 06:00 | 14:00 | 0 | 1 | ☐ | ☒ | ☒ | ☒ | ☐ | ☐ | ☐ |

Shift Pattern Ent Link: Links shift schedule template to an entity

| Shift Sched Ent ID | Ent ID | Pattern ID |
|---|---|---|
| 1 | 1 | 1 |
| 2 | 2 | 1 |

FIG. 14

Runtime Output - Shift History:
Eastern Standard Time (Nov-Mar): -5 hrs from UTC;  Eastern Daylight Savings Time (Apr-Oct): -4 hrs from UTC
Pacific Standard Time (Nov-Mar): -8 hrs from UTC;  Pacific Daylight Savings Time (Apr-Oct): -7 hrs from UTC

| Ent Id | Shift Id | Shift Start Local | Shift End Local | Shift Start Utc | Shift End Utc | Pattern Id | Shift Comments |
|---|---|---|---|---|---|---|---|
| Week of Oct 25th 2020: Entity 1 (in Eastern Time Zone) shift schedules; Currently in Daylight Savings Time ||||||||
| 1 | 1 | 2020-10-26 06:00 (Mo) | 2020-10-26 14:00 (Mo) | 2020-10-26 10:00 | 2020-10-26 18:00 | 1 | |
| 1 | 1 | 2020-10-27 06:00 (Tu) | 2020-10-27 14:00 (Tu) | 2020-10-27 10:00 | 2020-10-27 18:00 | 1 | |
| 1 | 1 | 2020-10-28 06:00 (We) | 2020-10-28 14:00 (We) | 2020-10-28 10:00 | 2020-10-28 18:00 | 1 | |
| 1 | 0 | 2020-10-28 14:00 (We) | 2020-11-02 06:00 (Mo) | 2020-10-28 18:00 | 2020-11-02 11:00 | Null | |
| Entity 2 (in Pacific Time Zone) shift schedules; Currently in Daylight Savings Time ||||||||
| 2 | 1 | 2020-10-26 06:00 (Mo) | 2020-10-26 14:00 (Mo) | 2020-10-26 13:00 | 2020-10-26 21:00 | 1 | |
| 2 | 1 | 2020-10-27 06:00 (Tu) | 2020-10-27 14:00 (Tu) | 2020-10-27 13:00 | 2020-10-27 21:00 | 1 | |
| 2 | 1 | 2020-10-28 06:00 (We) | 2020-10-28 14:00 (We) | 2020-10-28 13:00 | 2020-10-28 21:00 | 1 | |
| 2 | 0 | 2020-10-28 14:00 (We) | 2020-11-02 06:00 (Mo) | 2020-10-28 21:00 | 2020-11-02 14:00 | Null | |
| Week of Nov 1st 2020 with DST change over, Entity 1 is in Eastern Standard Time ||||||||
| 1 | 1 | 2020-11-02 06:00 (Mo) | 2020-11-02 14:00 (Mo) | 2020-11-02 11:00 | 2020-11-02 19:00 | 1 | |
| 1 | 1 | 2020-11-03 06:00 (Tu) | 2020-11-03 14:00 (Tu) | 2020-11-03 11:00 | 2020-11-03 19:00 | 1 | |
| 1 | 1 | 2020-11-04 06:00 (We) | 2020-11-04 14:00 (We) | 2020-11-04 11:00 | 2020-11-04 19:00 | 1 | |
| 1 | 0 | 2020-11-04 14:00 (We) | 2020-11-09 06:00 (Mo) | 2020-11-04 19:00 | 2020-11-09 11:00 | Null | |
| Entity 2 (in Pacific Time Zone) shift schedules; Currently in Pacific Standard Time ||||||||
| 2 | 1 | 2020-11-02 06:00 (Mo) | 2020-11-02 14:00 (Mo) | 2020-11-02 14:00 | 2020-11-02 22:00 | 1 | |
| 2 | 1 | 2020-11-03 06:00 (Tu) | 2020-11-03 14:00 (Tu) | 2020-11-03 14:00 | 2020-11-03 22:00 | 1 | |
| 2 | 1 | 2020-11-04 06:00 (We) | 2020-11-04 14:00 (We) | 2020-11-04 14:00 | 2020-11-04 22:00 | 1 | |
| 2 | 0 | 2020-11-04 14:00 (We) | 2020-11-09 06:00 (Mo) | 2020-11-04 21:00 | 2020-11-09 14:00 | Null | |

FIG. 15

Shift Pattern: Pattern ID is primary key, pattern name + start eff local is unique

| Pattern ID | Pattern Name | Start Eff Local | End Eff Local | Recurring | Additive | Enabled | Comments |
|---|---|---|---|---|---|---|---|
| 1 | Starting Shift Pattern | 2015-01-01 | NULL | ☒ | ☐ | ☒ | |
| 2 | 2020 Shift Pattern | 2020-01-25 | NULL | ☒ | ☐ | ☒ | |

Shift Template: Only for repeated/recurring shift templates

| Pattern ID | Start Time | End Time | End Day Span | Shift Id | Sun | Mon | Tue | Wed | Thu | Fri | Sat |
|---|---|---|---|---|---|---|---|---|---|---|---|
| 1 | 06:00 | 14:00 | 0 | 1 | ☐ | ☒ | ☒ | ☒ | ☐ | ☐ | ☐ |
| 2 | 06:00 | 14:00 | 0 | 1 | ☐ | ☒ | ☒ | ☐ | ☐ | ☐ | ☐ |
| 2 | 14:00 | 22:00 | 0 | 2 | ☐ | ☒ | ☒ | ☐ | ☐ | ☐ | ☐ |
| 2 | 22:00 | 06:00 (next day) | 1 | 3 | ☐ | ☐ | ☐ | ☐ | ☐ | ☐ | ☐ |

Shift Pattern Ent Link: Links shift schedule template to an entity

| Shift Sched Ent ID | Ent ID | Pattern ID |
|---|---|---|
| 1 | 1 | 1 |
| 2 | 2 | 1 |
| 1 | 1 | 2 |

FIG. 16

Runtime Output - Shift History: Only the affected days are presented below
Eastern Standard Time (Nov-Mar): -5 hrs from UTC; Eastern Daylight Savings Time (Apr-Oct): -4 hrs from UTC
Pacific Standard Time (Nov-Mar): -8 hrs from UTC; Pacific Daylight Savings Time (Apr-Oct): -7 hrs from UTC

| Ent Id | Shift Id | Shift Start Local | Shift End Local | Shift Start Utc | Shift End Utc | Pattern Id | Shift Comments |
|---|---|---|---|---|---|---|---|
| Week of Oct 25th 2020; Entity 1 (in Eastern Time Zone) shift schedules; Currently in Daylight Savings Time | | | | | | | |
| 1 | 1 | 2020-10-26 06:00 (Mo) | 2020-10-26 14:00 (Mo) | 2020-10-26 10:00 | 2020-10-26 18:00 | 2 | |
| 1 | 2 | 2020-10-26 14:00 (Mo) | 2020-10-26 22:00 (Mo) | 2020-10-26 18:00 | 2020-10-27 02:00 | 2 | |
| 1 | 3 | 2020-10-26 22:00 (Mo) | 2020-10-27 06:00 (Tu) | 2020-10-26 02:00 | 2020-10-27 10:00 | 2 | |
| 1 | 1 | 2020-10-27 06:00 (Tu) | 2020-10-27 14:00 (Tu) | 2020-10-27 10:00 | 2020-10-27 18:00 | 2 | |
| 1 | 2 | 2020-10-27 14:00 (Tu) | 2020-10-27 22:00 (Tu) | 2020-10-27 18:00 | 2020-10-28 02:00 | 2 | |
| 1 | 3 | 2020-10-27 22:00 (Tu) | 2020-10-28 06:00 (We) | 2020-10-28 02:00 | 2020-10-28 10:00 | 2 | |
| 1 | 0 | 2020-10-28 06:00 (We) | 2020-11-02 06:00 (Mo) | 2020-10-28 10:00 | 2020-11-02 11:00 | Null | Note: this pattern (the most recent pattern) has no shifts from Wed to next Mon |
| Entity 2 (in Pacific Time Zone) shift schedules; Currently in Daylight Savings Time | | | | | | | |
| 2 | 1 | 2020-10-26 06:00 (Mo) | 2020-10-26 14:00 (Mo) | 2020-10-26 13:00 | 2020-10-26 21:00 | 1 | |
| 2 | 1 | 2020-10-27 06:00 (Tu) | 2020-10-27 14:00 (Tu) | 2020-10-27 13:00 | 2020-10-27 21:00 | 1 | |
| 2 | 1 | 2020-10-28 06:00 (We) | 2020-10-28 14:00 (We) | 2020-10-28 13:00 | 2020-10-28 21:00 | 1 | |
| 2 | 0 | 2020-10-28 14:00 (We) | 2020-11-02 06:00 (Mo) | 2020-11-28 21:00 | 2020-11-02 14:00 | Null | |
| Week of Nov 1st 2020 with DST change over; Entity 1 is in Eastern Standard Time | | | | | | | |
| 1 | 1 | 2020-11-02 06:00 (Mo) | 2020-11-02 14:00 (Mo) | 2020-11-02 11:00 | 2020-11-02 19:00 | 2 | |
| 1 | 2 | 2020-11-02 14:00 (Mo) | 2020-11-02 22:00 (Mo) | 2020-11-02 19:00 | 2020-11-03 03:00 | 2 | |
| 1 | 3 | 2020-11-02 22:00 (Mo) | 2020-11-03 06:00 (Tu) | 2020-11-03 03:00 | 2020-11-03 11:00 | 2 | |
| 1 | 1 | 2020-11-03 06:00 (Tu) | 2020-11-03 14:00 (Tu) | 2020-11-03 11:00 | 2020-11-03 19:00 | 2 | |
| 1 | 2 | 2020-11-03 14:00 (Tu) | 2020-11-03 22:00 (Tu) | 2020-11-03 19:00 | 2020-11-04 03:00 | 2 | |
| 1 | 3 | 2020-11-03 22:00 (Tu) | 2020-11-04 06:00 (We) | 2020-11-04 03:00 | 2020-11-04 11:00 | 2 | |
| 1 | 0 | 2020-11-04 06:00 (We) | 2020-11-09 06:00 (Mo) | 2020-11-04 11:00 | 2020-11-09 11:00 | Null | Note: this pattern (the most recent pattern) has no shifts from Wed to next Mon |
| Entity 2 (in Pacific Time Zone) shift schedules; Currently in Pacific Standard Time | | | | | | | |
| 2 | 1 | 2020-11-02 06:00 (Mo) | 2020-11-02 14:00 (Mo) | 2020-11-02 14:00 | 2020-11-02 22:00 | 1 | |
| 2 | 1 | 2020-11-03 06:00 (Tu) | 2020-11-03 14:00 (Tu) | 2020-11-03 14:00 | 2020-11-03 22:00 | 1 | |
| 2 | 1 | 2020-11-04 06:00 (We) | 2020-11-04 14:00 (We) | 2020-11-04-04 14:00 | 2020-11-04 22:00 | 1 | |
| 2 | 0 | 2020-11-04 14:00 (We) | 2020-11-09 06:00 (Mo) | 2020-11-04 22:00 | 2020-11-09 14:00 | Null | |

FIG. 17

Shift Pattern: (Pattern ID is primary key)

| Pattern ID | Pattern Name | Start Eff Local | End Eff Local | Recurring | Additive | Enabled | Comments |
|---|---|---|---|---|---|---|---|
| 1 | Starting Shift Pattern | 2015-01-01 | NULL | ☒ | ☐ | ☒ | |
| 2 | 2020 Shift Pattern | 2020-01-25 | NULL | ☒ | ☐ | ☒ | |
| 3 | Oct-Nov 2020 Over-Time | 2020-10-25 06:00:00 | 2020-11-04 06:30:00 | ☒ | ☒ | ☒ | |

Shift Template: Only for repeated/recurring shift templates

| Pattern ID | Start Time | End Time | End Day Span | Shift Id | Sun | Mon | Tue | Wed | Thu | Fri | Sat |
|---|---|---|---|---|---|---|---|---|---|---|---|
| 1 | 06:00 | 14:00 | 0 | 1 | ☐ | ☒ | ☒ | ☒ | ☐ | ☐ | ☐ |
| 2 | 06:00 | 14:00 | 0 | 1 | ☐ | ☒ | ☒ | ☐ | ☐ | ☐ | ☐ |
| 2 | 14:00 | 22:00 | 0 | 2 | ☐ | ☒ | ☒ | ☐ | ☐ | ☐ | ☐ |
| 2 | 22:00 | 06:00 (next day) | 1 | 3 | ☐ | ☒ | ☒ | ☐ | ☐ | ☐ | ☐ |
| 3 | 06:00 | 15:00 | 0 | 1 | ☐ | ☐ | ☐ | ☐ | ☐ | ☐ | ☐ |

Shift Pattern Ent Link: Links shift schedule template to an entity

| Shift Sched Ent ID | Ent ID | Pattern ID |
|---|---|---|
| 1 | 1 | 1 |
| 2 | 2 | 1 |
| 1 | 1 | 2 |
| 1 | 1 | 3 |

FIG. 18

Runtime Output - Shift History: Only the affected days are presented below
- No change in shift schedules for Entity 2, since entity 1 is the only linked to pattern 3.
  Therefore, the shift schedules for entity 2 and its descendants are not affected
- Only on Tuesdays, the shift schedule for entity 1 and its descendants are extended for the
  configured period of time: 2020-10-25 06:00:00 to 2020-11-04 06:30:00.
Eastern Standard Time (Nov-Mar): -5 hrs from UTC;  Eastern Daylight Savings Time (Apr-Oct): -4 hrs from UTC
Pacific Standard Time (Nov-Mar): -8 hrs from UTC;  Pacific Daylight Savings Time (Apr-Oct): -7 hrs from UTC

| Ent Id | Shift Id | Shift Start Local | Shift End Local | Shift Start Utc | Shift End Utc | Pattern Id | Shift Comments |
|---|---|---|---|---|---|---|---|
| Week of Oct 18th 2020: Entity 1 (in Eastern Time Zone) shift schedules; Currently in Daylight Savings Time | | | | | | | |
| 1 | 3 | 2020-10-19 22:00 (Mo) | 2020-10-20 06:00 (Tu) | 2020-10-20 02:00 | 2020-10-20 10:00 | 2 | |
| 1 | 1 | 2020-10-20 06:00 (Tu) | 2020-10-20 14:00 (Tu) | 2020-10-20 10:00 | 2020-10-20 18:00 | 2 | |
| 1 | 2 | 2020-10-20 14:00 (Tu) | 2020-10-20 22:00 (Tu) | 2020-10-20 18:00 | 2020-10-21 02:00 | 2 | |
| Week of Oct 25th 2020: Entity 1 (in Eastern Time Zone) shift schedules; Currently in Daylight Savings Time | | | | | | | |
| 1 | 3 | 2020-10-26 22:00 (Mo) | 2020-10-27 06:00 (Tu) | 2020-10-27 02:00 | 2020-10-27 10:00 | 2 | |
| 1 | 1 | 2020-10-27 06:00 (Tu) | 2020-10-27 15:00 (Tu) | 2020-10-27 10:00 | 2020-10-27 19:00 | 3 | |
| 1 | 2 | 2020-10-27 15:00 (Tu) | 2020-10-27 22:00 (Tu) | 2020-10-27 19:00 | 2020-10-28 02:00 | 2 | |
| Week of Nov 1st 2020 with DST change over; Entity 1 is in Eastern Standard Time | | | | | | | |
| 1 | 3 | 2020-11-02 22:00 (Mo) | 2020-11-03 06:00 (Tu) | 2020-11-03 03:00 | 2020-11-03 11:00 | 2 | |
| 1 | 1 | 2020-11-03 06:00 (Tu) | 2020-11-03 15:00 (Tu) | 2020-11-03 11:00 | 2020-11-03 20:00 | 3 | |
| 1 | 2 | 2020-11-03 15:00 (Tu) | 2020-11-03 22:00 (Tu) | 2020-11-03 20:00 | 2020-11-04 03:00 | 2 | |
| Week of Nov 8th 2020: Entity 1 is in Eastern Standard Time | | | | | | | |
| 1 | 3 | 2020-11-09 22:00 (Mo) | 2020-11-10 06:00 (Tu) | 2020-11-10 03:00 | 2020-11-03 11:00 | 2 | |
| 1 | 1 | 2020-11-010 06:00 (Tu) | 2020-11-10 14:00 (Tu) | 2020-11-10 11:00 | 2020-11-10 19:00 | 2 | |
| 1 | 2 | 2020-11-10 14:00 (Tu) | 2020-11-10 22:00 (Tu) | 2020-11-10 19:00 | 2020-11-11 03:00 | 2 | |

FIG. 19

Shift Pattern: (Pattern ID is primary key)

| Pattern ID | Pattern Name | Start Eff Local | End Eff Local | Recurring | Additive | Enabled | Comments |
|---|---|---|---|---|---|---|---|
| 1 | Starting Shift Pattern | 2015-01-01 | NULL | ☒ | ☐ | ☒ | |
| 2 | 2020 Shift Pattern | 2020-01-25 | NULL | ☒ | ☐ | ☒ | |
| 3 | Oct-Nov 2020 Over-Time | 2020-10-25 06:00:00 | 2020-11-04 06:30:00 | ☐ | ☒ | ☒ | |
| 4 | Christmas Holiday Schedule | 2020-12-25 06:00:00 | 2020-01-04 06:00:00 | ☐ | ☐ | ☒ | |

Shift Template: Only for repeated/recurring shift templates

| Pattern ID | Start Time | End Time | End Day Span | Shift Id | Sun | Mon | Tue | Wed | Thu | Fri | Sat |
|---|---|---|---|---|---|---|---|---|---|---|---|
| 1 | 06:00 | 14:00 | 0 | 1 | ☐ | ☒ | ☒ | ☒ | ☐ | ☐ | ☐ |
| 2 | 06:00 | 14:00 | 0 | 1 | ☒ | ☒ | ☒ | ☒ | ☒ | ☒ | ☒ |
| 2 | 14:00 | 22:00 | 0 | 2 | ☒ | ☒ | ☒ | ☒ | ☒ | ☒ | ☒ |
| 2 | 22:00 | 06:00 (next day) | 1 | 3 | ☐ | ☒ | ☒ | ☒ | ☒ | ☒ | ☒ |
| 3 | 06:00 | 15:00 | 0 | 1 | ☐ | ☐ | ☐ | ☐ | ☐ | ☐ | ☐ |

Shift Pattern Ent Link: Links shift schedule template to an entity

| Shift Sched Ent ID | Ent ID | Pattern ID |
|---|---|---|
| 1 | 1 | 2 |
| 2 | 2 | 2 |
| 1 | 1 | 4 |
| 2 | 2 | 4 |

FIG. 20

Runtime Output - Shift History: Only the affected days are presented below
Eastern Standard Time (Nov-Mar): -5 hrs from UTC; Eastern Daylight Savings Time (Apr-Oct): -4 hrs from UTC
Pacific Standard Time (Nov-Mar): -8 hrs from UTC; Pacific Daylight Savings Time (Apr-Oct): -7 hrs from UTC

| Ent Id | Shift Id | Shift Start Local | Shift End Local | Shift Start Utc | Shift End Utc | Pattern Id | Shift Comments |
|---|---|---|---|---|---|---|---|
| Week of Dect 20th 2020: Entity 1 (in Eastern Time Zone) shift schedules; Currently in Eastern Standard Time ||||||||
| 1 | 2 | 2020-12-24 14:00 (Th) | 2020-12-24 22:00 (Th) | 2020-12-24 19:00 | 2020-12-25 03:00 | 2 | |
| 1 | 3 | 2020-12-24 22:00 (Th) | 2020-12-25 06:00 (Fr) | 2020-12-25 03:00 | 2020-12-25 11:00 | 2 | |
| 1 | 0 | 2020-12-25 06:00 (Th) | 2021-01-04 06:00 (Mo) | 2020-12-25 11:00 | 2021-01-04 11:00 | 4 | |
| 1 | 1 | 2021-01-04 06:00 (Mo) | 2021-01-04 14:00 (Mo) | 2021-01-04 11:00 | 2021-01-04 19:00 | 2 | |
| 1 | 2 | 2021-01-04 14:00 (Mo) | 2021-01-04 22:00 (Mo) | 2021-01-04 19:00 | 2021-01-05 03:00 | 2 | |
| Week of Dect 25th 2020: Entity 2 (in Pacific Time Zone) shift schedules; Currently in Pacific Standard Time ||||||||
| 2 | 2 | 2020-12-24 14:00 (Th) | 2020-12-24 22:00 (Th) | 2020-12-24 22:00 | 2020-12-25 06:00 | 2 | |
| 2 | 3 | 2020-12-24 22:00 (Th) | 2020-12-25 06:00 (Fr) | 2020-12-25 06:00 | 2020-12-25 14:00 | 2 | |
| 2 | 0 | 2020-12-25 06:00 (Th) | 2021-01-04 06:00 (Mo) | 2020-12-25 14:00 | 2021-01-04 14:00 | 4 | |
| 2 | 1 | 2021-01-04 06:00 (Mo) | 2021-01-04 14:00 (Mo) | 2021-01-04 14:00 | 2021-01-04 22:00 | 2 | |
| 2 | 2 | 2021-01-04 14:00 (Mo) | 2021-01-04 22:00 (Mo) | 2021-01-04 22:00 | 2021-01-05 06:00 | 2 | |

FIG. 21

Shift Pattern:

| Pattern ID | Pattern Name | Start Eff Local | End Eff Local | Recurring | Additive | Enabled | Comments |
|---|---|---|---|---|---|---|---|
| 1 | Starting Shift Pattern | 2015-01-01 | NULL | ☒ | ☐ | ☒ | |
| 2 | 2020 Shift Pattern | 2020-01-25 | NULL | ☒ | ☐ | ☒ | |
| 3 | Oct-Nov 2020 Over-Time | 2020-10-25 06:00:00 | 2020-11-04 06:30:00 | ☐ | ☒ | ☒ | |
| 4 | Christmas Holiday Schedule | 2020-12-25 06:00:00 | 2020-01-04 06:00:00 | ☐ | ☐ | | |
| 5 | Maintenance/Repair Work | 2020-10-19 12:00:00 | 2020-01-19 16:00:00 | ☐ | ☐ | ☒ | Grinder machine repair work |

Shift Template: Only for repeated/recurring shift templates

| Pattern ID | Start Time | End Time | End Day Span | Shift Id | Sun | Mon | Tue | Wed | Thu | Fri | Sat |
|---|---|---|---|---|---|---|---|---|---|---|---|
| 1 | 06:00 | 14:00 | 0 | 1 | ☐ | ☒ | ☒ | ☒ | ☒ | ☒ | ☐ |
| 2 | 06:00 | 14:00 | 0 | 1 | ☒ | ☒ | ☒ | ☒ | ☒ | ☒ | ☒ |
| 2 | 14:00 | 22:00 | 0 | 2 | ☒ | ☒ | ☒ | ☒ | ☒ | ☒ | ☒ |
| 2 | 22:00 | 06:00 (next day) | 1 | 3 | ☐ | ☒ | ☒ | ☒ | ☒ | ☒ | ☐ |
| 3 | 06:00 | 15:00 | 0 | 1 | ☐ | ☐ | ☐ | ☐ | ☐ | ☐ | ☐ |

Shift Pattern Ent Link: Links shift schedule template to an entity

| Shift Sched Ent ID | Ent ID | Pattern ID |
|---|---|---|
| 1 | 1 | 2 (24*7* 365 days schedule except Christmas Holidays) |
| 2 | 2 | 2 (24*7*365 days schedule except Christmas Holidays) |
| 1 | 3 (Grinder) | 5 (Maintenance/Repair Work) |

FIG. 22

Runtime Output - Shift History: Only the affected days are presented below
-The shift schedules for Entity 2 and its descendants are not affected
Eastern Standard Time (Nov-Mar): -5 hrs from UTC; Eastern Daylight Savings Time (Apr-Oct): -4 hrs from UTC
Pacific Standard Time (Nov-Mar): -8 hrs from UTC; Pacific Daylight Savings Time (Apr-Oct): -7 hrs from UTC

| Ent Id | Shift Id | Shift Start Local | Shift End Local | Shift Start Utc | Shift End Utc | Pattern Id | Shift Comments |
|---|---|---|---|---|---|---|---|
| Week of Oct 11th 2020: Entity 1 (in Eastern Time Zone) shift schedules: Currently in Eastern Daylight Savings Time | | | | | | | |
| Note: Entity 3 follows the same schedule as Entity1 for this week | | | | | | | |
| 1 | 3 | 2020-10-11 22:00 (Su) | 2020-10-12 06:00 (Mo) | 2020-12-24 19:00 | 2020-10-12 10:00 | 2 | |
| 1 | 1 | 2020-10-12 06:00 (Mo) | 2020-10-12 14:00 (Mo) | 2020-12-25 03:00 | 2020-10-12 18:00 | 2 | |
| 1 | 2 | 2020-10-12 14:00 (Mo) | 2020-10-12 22:00 (Mo) | 2020-12-25 11:00 | 2021-10-13 02:00 | 2 | |
| Week of Oct 18th 2020: Entity 1 (in Eastern Time Zone) shift schedules: Currently in Eastern Daylight Savings Time | | | | | | | |
| Note: Entity 3 follows a different schedule on 1st shift on Monday | | | | | | | |
| 1 | 3 | 2020-10-18 22:00 (Su) | 2020-10-19 06:00 (Mo) | 2020-10-19 02:00 | 2020-10-19 10:00 | 2 | |
| 1 | 1 | 2020-10-19 06:00 (Mo) | 2020-10-19 14:00 (Mo) | 2020-10-19 10:00 | 2020-10-19 18:00 | 2 | |
| 1 | 2 | 2020-10-19 14:00 (Mo) | 2020-10-19 22:00 (Mo) | 2020-10-19 18:00 | 2020-10-20 02:00 | 2 | |
| 3 | 3 | 2020-10-18 22:00 (Su) | 2020-10-19 06:00 (Mo) | 2020-10-19 02:00 | 2020-10-19 10:00 | 2 | |
| 3 | 1 | 2020-10-19 06:00 (Mo) | 2020-10-19 12:00 (Mo) | 2020-10-19 10:00 | 2020-10-19 16:00 | 2 | |
| 3 | 0 | 2020-10-19 12:00 (Mo) | 2020-10-19 16:00 (Mo) | 2020-10-19 16:00 | 2020-10-19 18:00 | 5 | Grinder machine repair work |
| 3 | 2 | 2020-10-19 16:00 (Mo) | 2020-10-19 22:00 (Mo) | 2020-10-19 20:00 | 2020-10-20 02:00 | 2 | |
| Week of Oct 25th 2020: Entity 1 (in Eastern Time Zone) shift schedules: Currently in Eastern Daylight Savings Time | | | | | | | |
| Note: Entity 3 follows the same schedule as Entity1 for this week | | | | | | | |
| 1 | 3 | 2020-10-25 22:00 (Su) | 2020-10-26 06:00 (Mo) | 2020-10-26 02:00 | 2020-10-26 10:00 | 2 | |
| 1 | 1 | 2020-10-26 06:00 (Mo) | 2020-10-26 14:00 (Mo) | 2020-10-26 10:00 | 2020-10-26 18:00 | 2 | |
| 1 | 2 | 2020-10-26 14:00 (Mo) | 2020-10-26 22:00 (Mo) | 2020-10-26 18:00 | 2020-10-27 02:00 | 2 | |

FIG. 23

Shift Pattern:

| Pattern ID | Pattern Name | Start Eff Local | End Eff Local | Recurring | Additive | Enabled | Comments |
|---|---|---|---|---|---|---|---|
| 1 | Starting Shift Pattern | 2015-01-01 | NULL | ☒ | ☐ | ☒ | |
| 2 | 2020 Shift Pattern | 2020-01-25 | NULL | ☒ | ☐ | ☒ | |
| 3 | Oct-Nov 2020 Over-Time | 2020-10-25 06:00:00 | 2020-11-04 06:30:00 | ☐ | ☒ | ☒ | |
| 4 | Christmas Holiday Schedule | 2020-12-25 06:00:00 | 2020-01-04 06:00:00 | ☐ | ☐ | ☒ | |
| 5 | Maintenance/Repair Work | 2020-10-17 06:00:00 (Sat) | 2020-01-19 06:00:00 (Mon) | ☐ | ☐ | ☒ | All machines in maintenance mode for 2 days |

Shift Template: Only for repeated/recurring shift templates

| Pattern ID | Start Time | End Time | End Day Span | Shift Id | Sun | Mon | Tue | Wed | Thu | Fri | Sat |
|---|---|---|---|---|---|---|---|---|---|---|---|
| 1 | 06:00 | 14:00 | 0 | 1 | ☐ | ☒ | ☒ | ☒ | ☒ | ☒ | ☐ |
| 2 | 06:00 | 14:00 | 0 | 1 | ☒ | ☒ | ☒ | ☒ | ☒ | ☒ | ☒ |
| 2 | 14:00 | 22:00 | 0 | 2 | ☒ | ☒ | ☒ | ☒ | ☒ | ☒ | ☒ |
| 2 | 22:00 | 06:00 (next day) | 1 | 3 | ☐ | ☐ | ☐ | ☐ | ☐ | ☐ | ☐ |
| 3 | 06:00 | 15:00 | 0 | 1 | ☐ | ☒ | ☒ | ☒ | ☒ | ☒ | ☐ |

Shift Pattern Ent Link: Links shift schedule template to an entity

| Shift Pattern Sched Ent ID | Ent ID | Pattern ID |
|---|---|---|
| 1 | 1 | 2 (24*7* 365 days schedule except Christmas Holidays) |
| 2 | 2 | 2 (24*7* 365 days schedule except Christmas Holidays) |
| 1 | 1 | 5 (Maintenance/Repair Work) |

FIG. 24

Runtime Output - Shift History: Only the affected days are presented below
 -The shift schedules for Entity 2 and its descendants are not affected
 Eastern Standard Time (Nov-Mar): -5 hrs from UTC; Eastern Daylight Savings Time (Apr-Oct): -4 hrs from UTC
 Pacific Standard Time (Nov-Mar): -8 hrs from UTC; Pacific Daylight Savings Time (Apr-Oct): -7 hrs from UTC

| Ent Id | Shift Id | Shift Start Local | Shift End Local | Shift Start Utc | Shift End Utc | Pattern Id | Shift Comments |
|---|---|---|---|---|---|---|---|
| Week of Oct 11 th 2020: Entity 1 (in Eastern Time Zone) shift schedules; Currently in Eastern Daylight Savings Time |||||||| 
| Note: Entity 3 follows the same schedule as Entity1 for this week ||||||||
| 1 | 3 | 2020-10-15 22:00 (Th) | 2020-10-16 06:00 (Fri) | 2020-10-16 02:00 | 2020-10-16 10:00 | 2 | |
| 1 | 1 | 2020-10-16 06:00 (Fri) | 2020-10-16 14:00 (Fri) | 2020-10-16 10:00 | 2020-10-16 18:00 | 2 | |
| 1 | 2 | 2020-10-16 14:00 (Fri) | 2020-10-16 22:00 (Fri) | 2020-10-16 18:00 | 2021-10-17 02:00 | 2 | |
| 1 | 3 | 2020-10-16 22:00 (Fri) | 2020-10-17 06:00 (Sat) | 2020-10-17 02:00 | 2020-10-17 10:00 | 2 | |
| 1 | 0 | 2020-10-17 06:00 (Sat) | 2020-10-19 06:00 (Mo) | 2020-10-17 10:00 | 2020-10-19 10:00 | 5 | All machines in maintenance mode for 2 days |
| 1 | 1 | 2020-10-19 06:00 (Mo) | 2020-10-19 14:00 (Mo) | 2020-10-19 10:00 | 2020-10-19 18:00 | 2 | |
| 1 | 2 | 2020-10-19 14:00 (Mo) | 2020-10-19 22:00 (Mo) | 2020-10-19 18:00 | 2020-10-20 02:00 | 2 | |

| ≡ AVEVA Insight | | ⌕ ⊙ ▦ ⊛ |
|---|---|---|
| Shift Patterns | | + ↻ |
| ☐ Name | Effective Date | Number of Shifts |
| ☐ High Season | 6/14/2020 | 5 |

FIG. 27

Shift Pattern

| Pattern Name | Effective Date | Pattern Applies To | Type |
|---|---|---|---|
| Low Season | 1/6/2020 | 2 Locations ▸ | Production ▸ |
| Type a unique pattern name | Select or type a date in format M/D/YYYY | Select at least one location with a time zone assigned | |

| Su | Mo | Tu | We | Th | Fr | Sa |
|---|---|---|---|---|---|---|

Select at least one day

Shift Starts At
6:00 AM
Use format: H:MM:TT
(Example: 12:00 PM)

Shift Name
Morning
Type a shift name

| Su | Mo | Tu | We | Th | Fr | Sa |
|---|---|---|---|---|---|---|

Select at least one day

Shift Starts At
2:00 AM
Use format: H:MM:TT
(Example: 12:00 PM)

Shift Name
Afternoon
Type a shift name

| Su | Mo | Tu | We | Th | Fr | Sa |
|---|---|---|---|---|---|---|

Select at least one day

Shift Starts At
10:00 PM
Use format: H:MM:TT
(Example: 12:00 PM)

Shift Name
No Shift
Type shift name

CANCEL | SAVE

FIG. 28

Production Shift Pattern

Pattern Name
Pattern name is required

Effective Date
8/16/2019 📅
Required

Type
Production ▾

CANCEL | SAVE

| Mo | Tu | We | Th | Fr | Sa | Su |

Select the days in the shift

Start Time
12:00 AM
Select or enter H:MM:TT

Pattern Applies To
2 Locations ▾

✓ Pattern Applies to
  2 locations
  ☑ Capper 12
  ☑ Texas/Houston Plant

✓ Select locations and
  click Apply
  > ☐ <script>alert('location');<
  ∨ ☐ Texas
    > ☐ Austin Plant
      ☐ Filter 101

APPLY

⊖

ADD SHIFT

FIG. 29

Production Shift Pattern

Pattern Name  
Pack Area Shift Pattern  
Pattern name is required and should be unique Effective Date  
8/21/2019  
Required Pattern Applies To  
1 Location ▾

Type  
Production ▾

CANCEL | SAVE

ADD SHIFT ▾

---

Start Time  
9:00 AM  
Select or enter H:MM:TT

Start Name  
Weekday Morning Shift ▾  
Shift name is required

| Mo | Tu | We | Th | Fr | Sa | Su |

Select the days in the shift

---

Start Time  
10:00 AM  
Select or enter H:MM:TT

Start Name  
Weekday Morning Shift ▾  
Shift name is required

| Mo | Tu | We | Th | Fr | Sa | Su |

Select the days in the shift

---

Start Time  
1:30 PM  
Select or enter H:MM:TT

Start Name  
Weekday Noon Shift ▾  
Shift name is required

| Mo | Tu | We | Th | Fr | Sa | Su |

Select the days in the shift

---

Start Time  
2:30 PM  
Select or enter H:MM:TT

Start Name  
Weekday Noon Shift ▾  
Shift name is required

| Mo | Tu | We | Th | Fr | Sa | Su |

Select the days in the shift

---

Start Time  
5:00 PM  
Select or enter H:MM:TT

Start Name  
Weekday Evening Shift ▾  
Shift name is required

| Mo | Tu | We | Th | Fr | Sa | Su |

Select the days in the shift

---

Start Time  
6:00 PM  
Select or enter H:MM:TT

Start Name  
Weekday Evening Shift ▾  
Shift name is required

| Mo | Tu | We | Th | Fr | Sa | Su |

Select the days in the shift

FIG. 30

SHIFT CONFIGURATIONS FOR MANUFACTURING EXECUTION SYSTEMS

CROSS-REFERENCE TO RELATED APPLICATION

This application claims the benefit of and priority to U.S. Provisional Application No. 63/315,162, filed Mar. 1, 2022, which is hereby incorporated herein by reference in its entirety for all purposes.

BACKGROUND

This disclosure generally relates to the field of networked computerized systems utilized to monitor, log, and display relevant manufacturing/production events and associated data. More particularly, some embodiments of the present disclosure relate to Manufacturing Execution Systems (MESs). Such systems generally execute above and/or outside of a control layer of a manufacturing and/or process control system to record production events and related event data.

Highly advanced human-machine interface/process visualization systems exist today that are linked to data sources such as sensors and controllers. Such systems acquire and digest (e.g., filter) process data. The digested process data is displayed on a graphical display rendered by a human machine interface. An example of such system is the well-known Wonderware INTOUCH® human-machine interface (HMI) software system for visualizing and controlling a wide variety of industrial processes. An INTOUCH HMI process visualization application includes a set of graphical views of a particular process. Each view, in turn, comprises one or more graphical elements. The graphical elements are "animated" in the sense that their display state changes over time in response to associated/linked data sources.

The MES monitors production and records various production and/or manufacturing events and applies business rules to render decisions governing production operations carried out by the Supervisory Control and Data Acquisition (SCADA) system. Many MES systems interface to higher level Enterprise Resource Planning (ERP) systems.

Current MESs do not support multiple (overriding) shift configurations. For example, there is no way to configure temporary shift definitions to cover an alternate shift schedule for a short amount of time, such as holiday schedules that override from 6 am-12 pm to 8 am-4 pm. In addition, there are no shift exceptions (additive or subtractive) with robust configurations to allow different combinations. In addition, current MESs may have a 1000 plus lines of convoluted code for shift change processes and frequently require creating and deleting records from a shift_to_go table.

Figure 1:
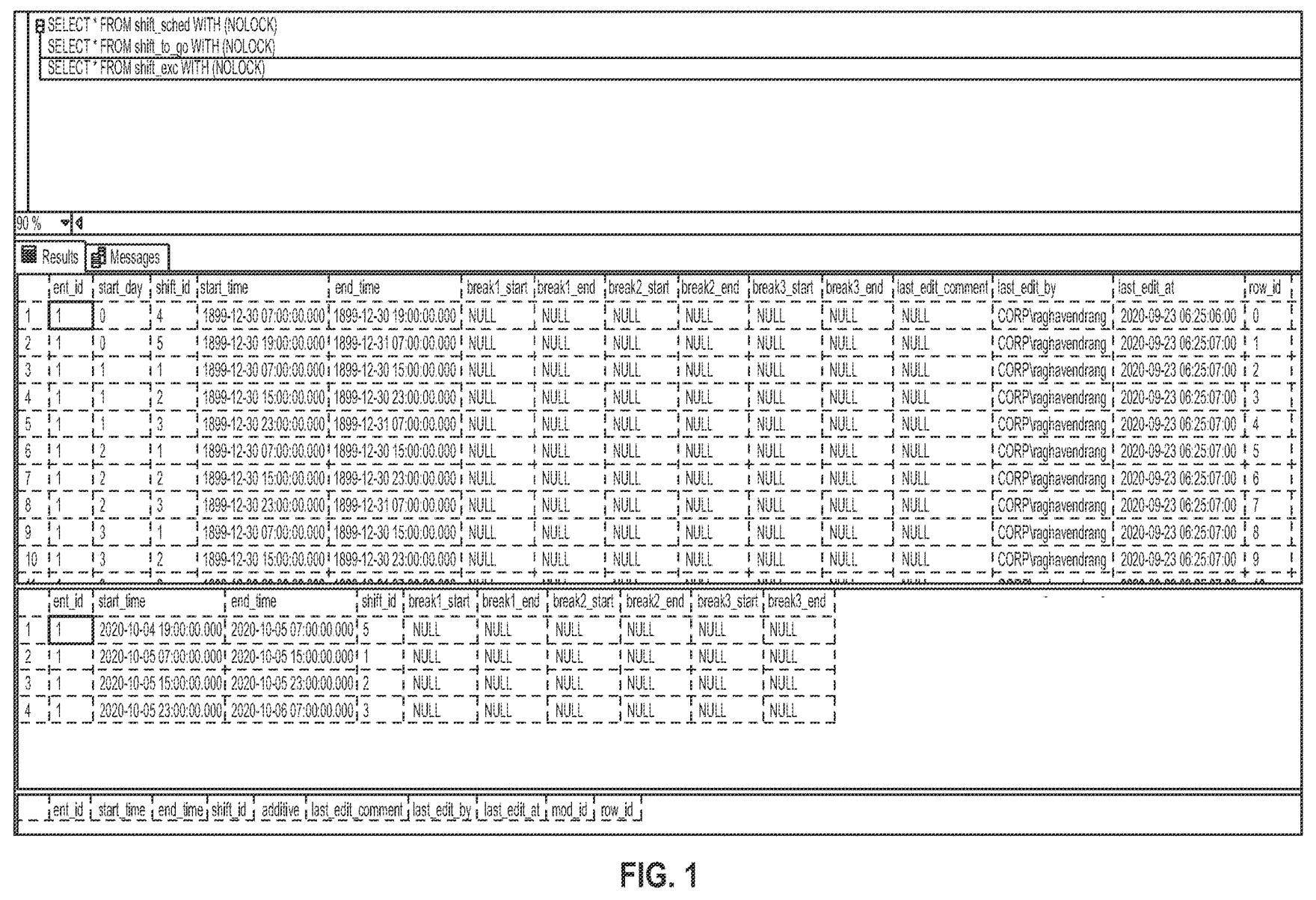

FIG. 1 illustrates a present schema for a shift change process in current MES systems. Daily Tasks (around midnight 12 a) creates shift schedules for the current day and the next 2 days in the shift_to_go table. Obsolete schedules are cleaned-up on a daily basis. The shift_to_go table has to be rebuilt for any changes made in the shift_sched or shift_exc tables. Shift exceptions are not handled well in these MES systems.

Therefore, there is a need in the art for an MES system able to effectively modify shift scheduling to reflect scheduling needs at various times of year and various locations.

SUMMARY

In some embodiments, the system comprises a SCADA platform and an MES platform. In some embodiments, runtime process data generated by a regulatory control platform is received by the SCADA platform through any combination of process data interfaces. In some embodiments, the source of the process data includes sensor data provided by field devices (i.e., components, assets, elements) to regulatory control processors (via a variety of interfaces). The process data thereafter passes from the regulatory control platform to the SCADA platform via any of a variety of communications channels including gateways, integrators, and runtime process data storage applications (e.g., plant Historian database).

In some embodiments, an MES application running on a plant monitoring application node in a SCADA and/or MES environment provides a series of views driven by production and/or utilization information contained within the configured entities (elements) within the MES database. In some embodiments, MES application software provides a configurable system for tracking the status (and thus utilization and availability) of plant equipment. In some embodiments, MES applications capture and provide (near) real-time, and/or substantially instantaneous plant and/or production information relating to the operational status of equipment within industrial (e.g.,) manufacturing process chains. In some embodiments, MES applications enable tracking equipment utilization and improving and/or optimizing plant equipment utilization through efficient use of the plant equipment.

In some embodiments, the MES applications described herein provide performance monitoring on an entity basis. In some embodiments, entities include physical assets in a process and/or industrial manufacturing facility (broadly referred to as a "plant" herein) whose activity is to be tracked by the MES. In some embodiments, entities include one or more of an entire plant, an area of a plant (e.g., a production floor or warehouse), an organizational group of machines (e.g., those in a particular department), a piece of equipment (i.e., asset; component: e.g., a mixer, dispenser, palletizer, etc.), and/or a module that makes up a piece of equipment. In some embodiments, entities may operate in varying states (e.g., running, idle, down, maintenance, etc.) at different times. In some embodiments, MES applications are configured to present information about the operational states of selected entities. In some embodiments, MES applications are configured to present information about any known reasons for a presently existing operational state of an entity. In some embodiments, MES applications are configured to present information about the production of an entity.

In some embodiments, MES applications provide configuration tools that allow users to create data models of entities, utilization states, and reasons to enable the display of relevant entity information. In some embodiments, an MES application includes model configuration templates for the various configurable MES models. In some embodiments, the MES is configured to enable a user to respond to queries in a configuration tool to populate the fields of a model configuration template (e.g., a shift configuration template) and instantiate a model of a particular entity, state, reason, etc.

In some embodiments, the MES is configured to generate a graphical user interface (GUI) that includes an entity configuration view which enables a user to query a new entity's name, capabilities, etc. In some embodiments, data models may be imported from unified SCADA systems into the MES application. In some systems, modeled entities may be related to modeled utilization states and reasons, for example, using relational database techniques.

In some embodiments, the disclosure is directed to a system for executing schedules within a manufacturing execution system (MES). In some embodiments, the MES comprises a manufacturing execution system (MES) configured to monitor, control, and/or create reports about a status of one or more entities within an industrial process. In some embodiments, the MES comprises a scheduling module configured to generate one or more schedules for the one or more entities.

In some embodiments, the system includes one or more computers comprising one or more processors and one or more non-transitory computer readable media, the one or more non-transitory computer readable media having program instructions stored thereon that when executed configures the scheduling module to execute one or more program steps. In some embodiments, a step includes to generate, by the one or more processors, a schedule pattern table. In some embodiments, a step includes to generate, by the one or more processors, a schedule template table. In some embodiments, a step includes to generate, by the one or more processors, an entity link table. In some embodiments, a step includes to link, by the one or more processors, the schedule template table and the entity link table to the schedule pattern table. In some embodiments, a step includes to create, by the one or more processors, the one or more schedules based on one or more parameters defined in at least one of the schedule pattern table, the schedule template table, and the entity link table.

In some embodiments, the schedule pattern table is configured to enable a user to define how schedule patterns are applied. In some embodiments, the schedule pattern table is configured to enable the user to define a pattern timeframe for a schedule pattern. In some embodiments, the pattern timeframe includes a start time and an end time for the schedule pattern.

In some embodiments, the schedule template table is configured to enable the user to define timeframe divisions of the pattern timeframe. In some embodiments, the schedule template table is configured to enable the user to define a pattern of days the schedule pattern is implemented. In some embodiments, the entity link table is configured to link the one or more schedules to at least one of the one or more entities within the industrial process.

In some embodiments, the one or more non-transitory computer readable media have further program instructions stored thereon that when executed cause the scheduling module to generate, by the one or more processors, overlapping patterns for a same entity. In some embodiments, the MES is configured to execute the overlapping patterns based on a pattern execution hierarchy. In some embodiments, the pattern execution hierarchy comprises a plurality of patterns within the schedule pattern table. In some embodiments, the scheduling module is configured to implement a priority of the overlapping patterns based on a respective pattern start time.

In some embodiments, priority of the overlapping patterns includes a first pattern comprising a first start date closest to a current date executing before a second pattern comprising a second start date before the first start date. In some embodiments, the scheduling module is configured to assign a first time zone to one or more time inputs received for the one or more schedules based on a first location of a first entity where the one or more time inputs were entered. In some embodiments, the scheduling module is configured to convert the first time zone to a second time zone based on a second location of a second entity to which the one or more scheduled are assigned. In some embodiments, the MES is configured to execute the one or more schedules for the second entity when the one or more time inputs entered at the first location match a current time at the second location.

In some embodiments, the one or more non-transitory computer readable media have further program instructions stored thereon that when executed cause the scheduling module to execute a step to generate, by the one or more processors, a graphical user interface (GUI). In some embodiments, a step includes to display, by the one or more processors, the schedule pattern table on the graphical user interface. In some embodiments, a step includes to display, by the one or more processors, one or more input fields for one or more schedule pattern table inputs for the schedule pattern table on the GUI. In some embodiments, the one or more schedule pattern table inputs include one or more of a pattern identification input, a pattern name input, a pattern start time input, a pattern end time input, a recurring input, an additive input, and an enabled input.

In some embodiments, the one or more non-transitory computer readable media have further program instructions stored thereon that when executed cause the scheduling module to generate, by the one or more processors, a graphical user interface (GUI). In some embodiments, a step includes to display, by the one or more processors, the schedule template table on the graphical user interface. In some embodiments, a step includes to display, by the one or more processors, one or more input fields for one or more schedule template table inputs for the schedule template table on the GUI.

In some embodiments, the one or more non-transitory computer readable media having further program instructions stored thereon that when executed cause the scheduling module to generate, by the one or more processors, a graphical user interface (GUI). In some embodiments, a step includes to display by the one or more processors, the entity link table on the graphical user interface. In some embodiments, a step includes to display, by the one or more processors, one or more input fields for one or more entity link table inputs for the entity link table on the GUI.

In some embodiments, the pattern of days includes one or more days of a week. In some embodiments, a maximum number the pattern of days is 7. In some embodiments, selection of the recurring input in the schedule pattern table configures the scheduling module to repeat the pattern of days in the in the schedule template table until a pattern end time defined by the pattern end time input in the schedule pattern table.

In some embodiments, the pattern timeframe includes the start time and the end time for the schedule pattern. In some embodiments, the sched. In some embodiments, the schedule pattern type includes a recurring schedule, an additive schedule, and/or an enabled schedule. In some embodiments, the MES is configured to control the one or more entities based at least in part on the one or more schedules.

DRAWING DESCRIPTION

FIG. 1 illustrates a present schema for current MES systems.

FIG. 2 shows an example screenshot of overlapping meeting schedules in Microsoft Outlook.

FIGS. 3 and 4 depict various table structures and relationships according to some embodiments.

FIGS. 5-7 illustrate a shift pattern table according to some embodiments.

FIGS. 8-10 show sections of a shift template table modified from a shift sched format according to some embodiments.

FIG. 8 illustrates an example table structure that does not relate to any particular examples (nor has any relation to other tables) in the other sections but is included for demonstration purposes about how the data presentation can look according to some embodiments.

FIG. 9 does not relate to any particular examples in other sections below but is for demonstration purposes about how the data presentation can look.

FIG. 10 shows a Table Structure for demonstration purposes using option 2 for easy visualization of data.

FIG. 11 depicts a new Shift Pattern Ent Link Table according to some embodiments.

FIG. 12 shows a modified table structure for a shift history table according to some embodiments.

Figure 13:
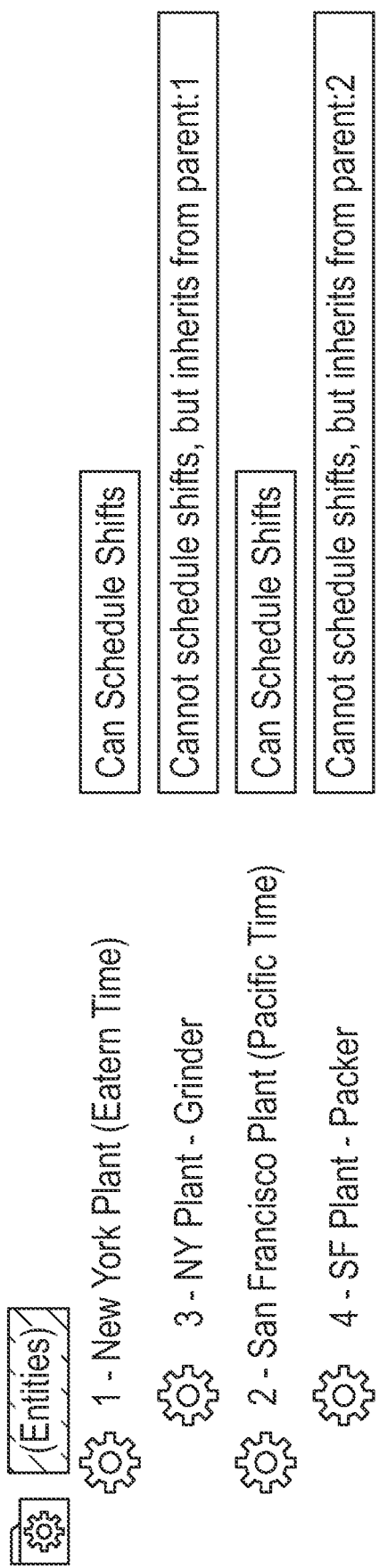

FIG. 13 shows examples of shift schedules and shift exceptions including an entity setup according to some embodiments.

FIGS. 14 and 15 show examples of regular shift schedules according to some embodiments.

FIGS. 16 and 17 demonstrate how shift templates are processed when a new pattern (most recent) becomes effective and how that overrides the old patterns.

FIGS. 18 and 19 demonstrate how additive patterns/templates override the existing/regular shift schedules according to some embodiments.

FIGS. 20 and 21 demonstrate how holiday shift patterns are processed by MES.

FIGS. 22 and 23 show a single entity maintenance (subtractive) exception schedule according to some embodiments.

FIGS. 24 and 25 depict a site/line entity maintenance exception schedule according to some embodiments.

Figure 26:
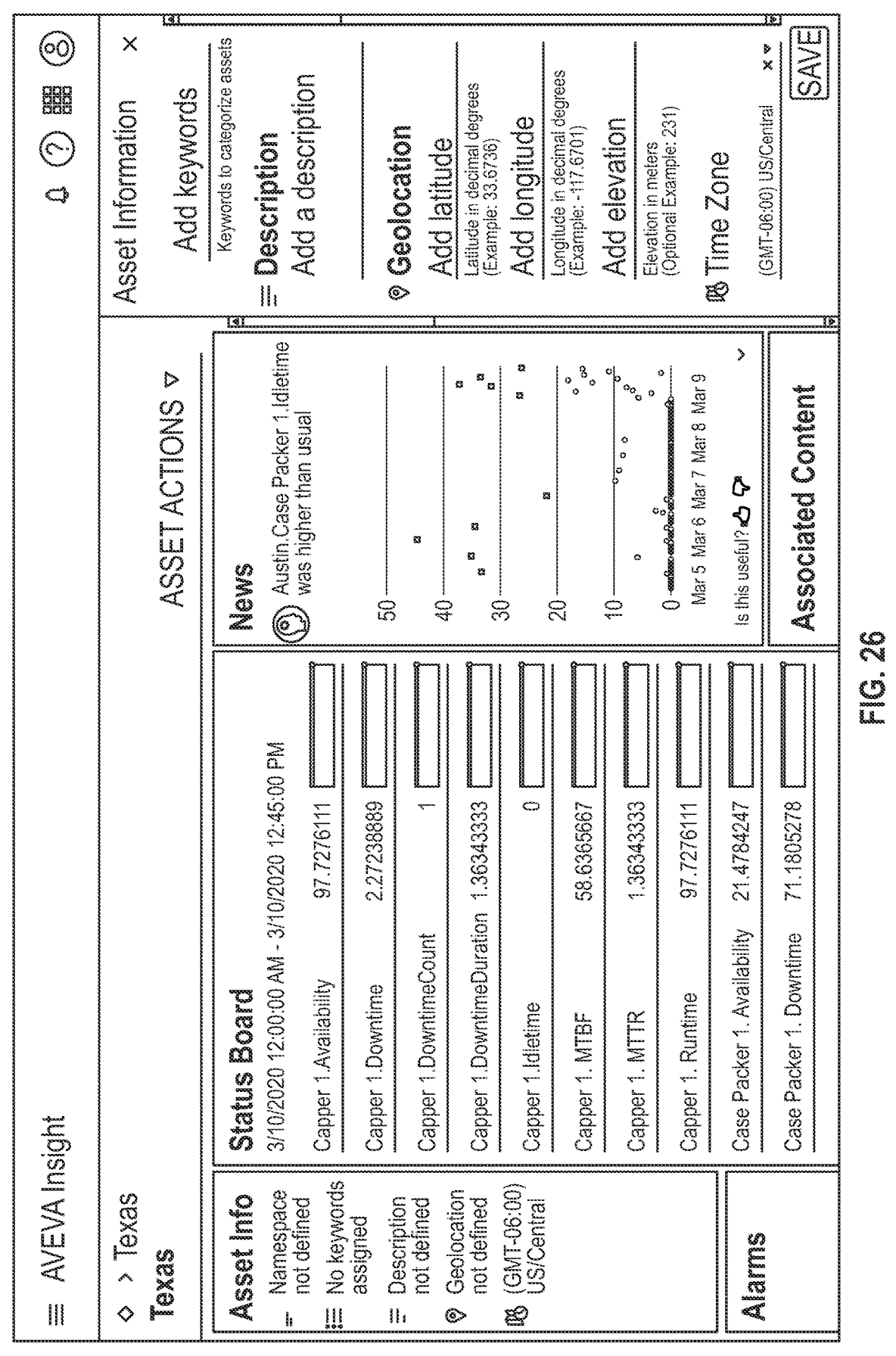

FIGS. 26-30 show example screenshots from AVEVA's Insight® Performance UI according to some embodiments.

Figure 31:
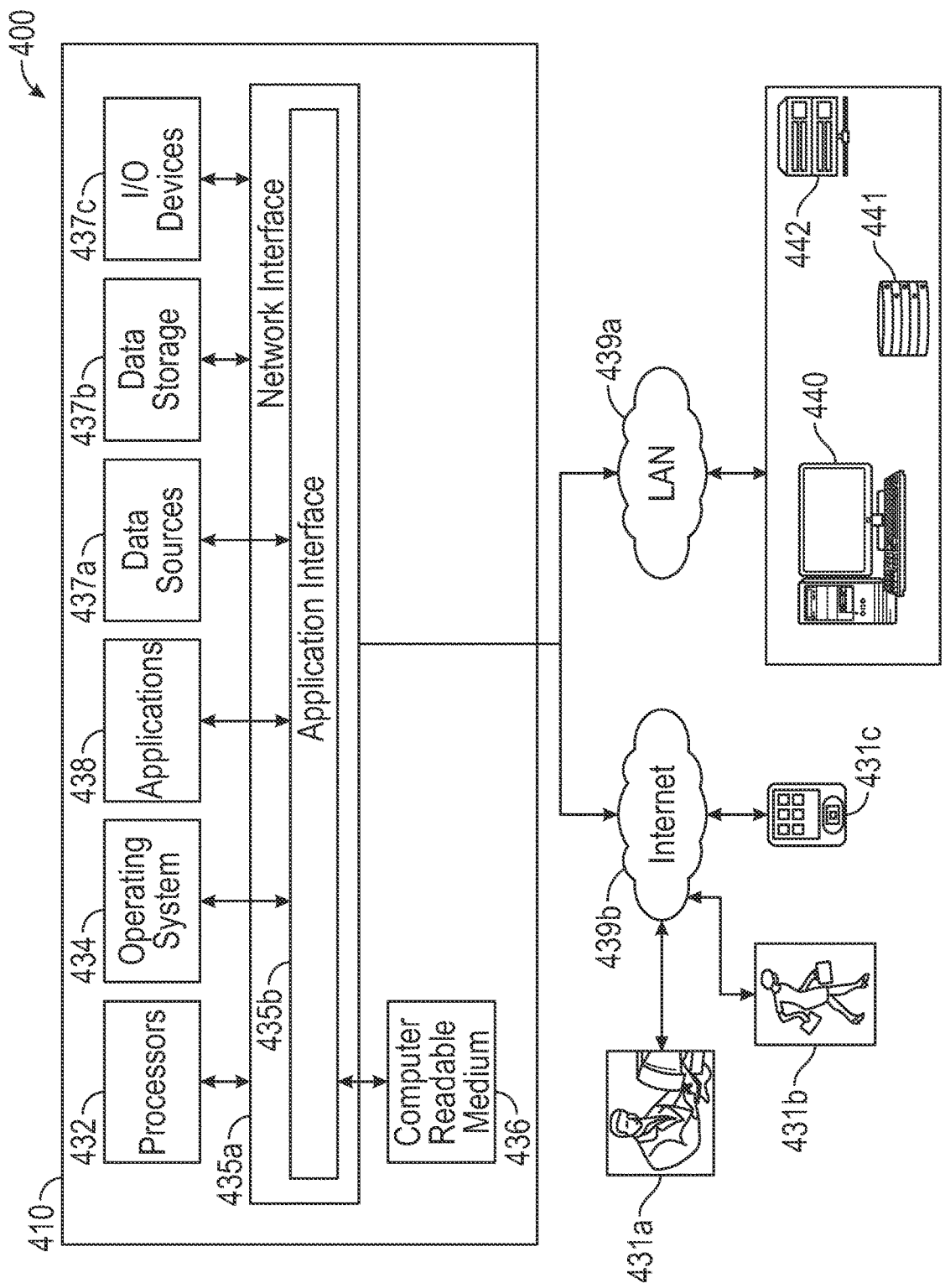

FIG. 31 illustrates a computer system enabling or comprising the systems and methods in accordance with some embodiments of the system.

Figure 32:
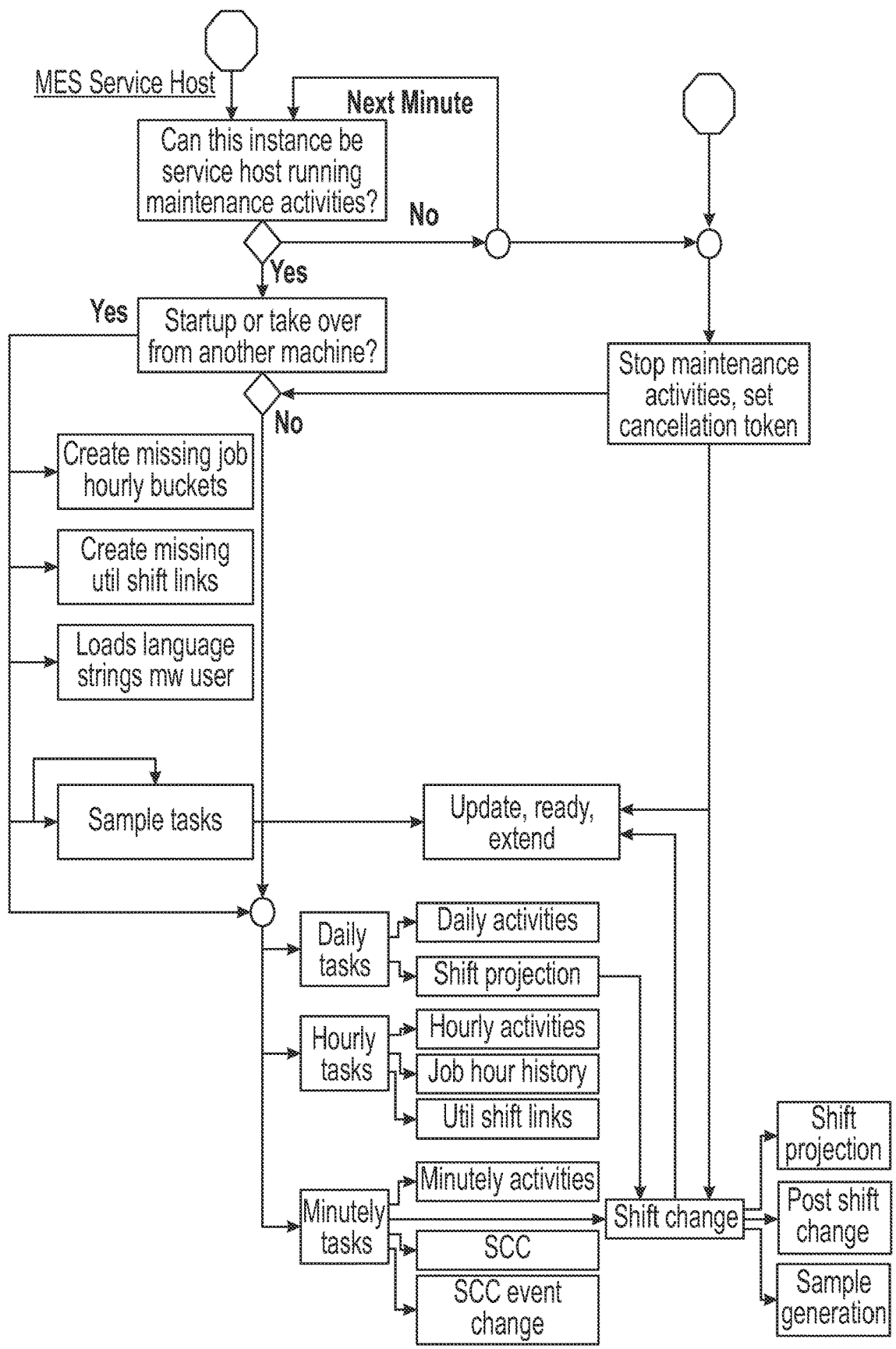

FIG. 32 shows a flow diagram depicting computer implemented execution steps performed by the MES according to some embodiments.

DETAILED DESCRIPTION

In some embodiments, the system includes software comprising processor executable instructions stored in one or more tangible, non-transitory computer readable media that when executed implement one or more steps. In some embodiments, the one or more steps (which may also be represented by the phrase "configured to") describe implementing one or more aspects of the system by one or more computer processors.

As used herein, the term "shift" is interchangeable with the word "schedule" for defining the metes and bounds of the system. The non-limiting example configurations of the system according to some embodiments presented herein are understood to be specific examples and details of the system described above to aid those of ordinary skill to make and use the system.

In some embodiments, the system is configured to provide production metrics about one or more physical production lines comprising an arrangement of physical entities. In some embodiments, a step includes displaying one or more interactive entity configuration views on a display of a workstation. In some embodiments, a step includes receiving user inputs associated with the one or more interactive entity configuration views. In some embodiments, user inputs include entity data representing one of the physical entities. In some embodiments, a step includes generating an entity data model from the entity data. In some embodiments, one or more steps are repeated to generate an entity data model for each of the physical entities in the physical production line.

In some embodiments, a step includes displaying one or more interactive line configuration views on a display of the workstation. In some embodiments, at least one of the one or more interactive line configuration views has a work area and a palette of entity configuration objects. In some embodiments, at least a portion of the entity configuration objects represent the entity data models generated as described above. In some embodiments, a step includes receiving user inputs that select the plurality of the entity configuration objects and/or placing them on the work area to create a graphical object model representing the physical production line. In some embodiments, the graphical object model comprises an arrangement of entity objects representing the arrangement of physical entities. In some embodiments, a step includes generating line data model based on the user inputs. In some embodiments, production data is received about the physical entities. In some embodiments, a step includes determining a production metric of the physical production line using the production data and the line data model. In some embodiments, a step includes displaying the production metric on the display as a step implemented by the system.

In some embodiments, an architecture for a manufacturing execution system (MES) includes a workstation that provides user access to resources maintained on an MES server. In some embodiments, the MES server is physically located remote from the workstation. In some embodiments, the workstation is in a different time zone than the workstation where scheduling information is entered and/or the MES server. In some embodiments, the workstation includes a personal computer, mobile device, or other suitable processing device with the capability to display MES information and/or allow for user input. In some embodiments, the workstation is configured to access MES resources on a server through a client application or a web browser (e.g., using a web portal). In some embodiments, the MES server includes an MES database, which stores data models used to describe the various production lines and entities in a physical plant.

In some embodiments, the MES server is configured to store procedures used, for example, in displaying information about the process plant at the workstation or in determining production metrics used to evaluate or predict the performance of the plant and/or production lines and entities contained therein. In some embodiments, the physical plant may report production and status information to the MES server by way of a communications link. In some embodiments, the communications link may include an intermediate SCADA system which communicates with the plant by way of process data interface. In some embodiments, data may be reported to the MES server directly from the plant floor either automatically or through manual data entry.

In some embodiments, an entity includes a physical device and/or a geographical location of a process facility. In some embodiments, entities are assets used for the production or storage of goods either directly or indirectly. In some embodiments, an entity can be a building, a location within a building, a department, a single machine, etc. In some embodiments, entities are assigned various capabilities, but are not required to have any capabilities assigned thereto. In some embodiments, an entity has the capability to schedule and run jobs, schedule shifts, capture machine utilization, capture labor information, communicate with machine tools (e.g., by Distributed Numerical Control), track overall equipment effectiveness (OEE), receive production items, ship production items, store production items, log data, copy folders of files regarding an item's production relative to the entity, and/or capture quality information.

In some embodiments, a job may be an instance of an operation for a work order. In some embodiments, in an MES, a physical entity may be represented by a data model associated with that entity stored. In some embodiments, the data model includes information about the capabilities assigned to the entity. In some embodiments, multiple instances of the same entity type are present. In some embodiments, these instances are members of an entity class that are capable of performing the same task in a production plant. In some embodiments, MES applications provide tools for creating data models describing an entity class. Other tools may allow easy instantiation of the class model to create corresponding models of each of the entity instances. In some embodiments, an entity state configuration view allows a user to select default utilization states that the MES associates with the entity when one or more of the following events occur: job starts, job ends, shift starts, shift ends. In some embodiments, a parent entity for a scheduling field allows a user to select an entity, whose model includes is capable of scheduling shifts. In some embodiments, the entity is a parent of the line from which the line and its entities inherit their scheduled shifts.

In some embodiments, entity shift scheduling is achieved using patterns that are capable of altering the length of the shift to accommodate real world scenarios (e.g., maintenance with a shorter shift and overtime with a longer shift) while allowing for both broad and narrow contexts (e.g., seasonal shift scheduling and/or other scheduling which can include one-off schedules). In some embodiments, shift scheduling is decoupled from entity configuration such that a modification to a shift schedule does not alter entity configuration. In some embodiments, the modifications are picked up and changes are processed at runtime. In some embodiments, though the same shift schedule may be linked to entities that are in different time zones, shifts are processed in local time zone of the entity. In some embodiments, changes to the configuration are detected and applied in the next minute at runtime. In some embodiments, the shift and shift scheduling scheme represent a novel way to consolidate all the shift information and project the upcoming shifts (including exception shifts) for all the entities.

In some embodiments, reporting on manufacturing plants in different parts of the world requires integration of complex shift configurations which often involve overlays. In some embodiments, the system allows configuration of shift patterns that are discrete and decoupled from entities which allows different types of exception-based shift schedules, such as weekend schedule, overtime, maintenance, holiday schedules, etc. In some embodiments, at runtime, the information from the shift configuration is consolidated to perform a shift change using the entity's time zone.

In some embodiments, the shift patterns (or schedule patterns) are flexible enough that a pattern can represent upcoming holidays, maintenance, etc., and are configured to be easily linked to a single downstream entity or the entire site. In some embodiments, an entity's national or local holidays or other events can be automatically populated in any of the scheduling processes described herein. In some embodiments, configuration changes are detected by the MES and processed in the next minute. In some embodiments, the system also projects shift schedules for up to a week containing regular and exception shift schedules for all entities.

In some embodiments, the system's shift configuration conveniently configures shifts using date properties that control a shift pattern's shelf life, i.e., when it becomes effective and when it becomes obsolete. In some embodiments, the shift configuration allows for a combination of regular shift patterns at parent entities and holiday/overtime shift exception patterns at single child entities. In some embodiments, the system's shift schedule includes the ability to configure more than one shift and link them to a pattern. In some embodiments, the system's shift pattern entity link (ent link) represents a many-to-many configuration that supports linking a single entity to multiple patterns or multiple entities to a single pattern. In some embodiments, regarding runtime, for entities at different sites in different time zones, the shift changes are processed at the local time for that entity. In some embodiments, the runtime uses the most recent start effective (eff) date to derive the shift schedule for an entity. In some embodiments, the runtime picks up the changes and processes the changes on the corresponding entities. Similarly, in some embodiments, the shift projections are updated when a configuration change is detected.

In some embodiments, the system is configured to detect the time zone of an entity and process shift changes local to the entity's time zone. In some embodiments, the system is configured to link/associate one or more shift schedules (patterns) to the entity and vice-versa. In some embodiments, the system is configured to create upcoming shift schedules, such as overtime, holiday, and maintenance schedules, thereby eliminating manual intervention to put the entity in respective shifts. In some embodiments, the system is configured to put a single entity or an entire site in a specific shift schedule. In some embodiments, the system is configured to project upcoming shift schedules that include all exceptions to the regular shift schedules.

In some embodiments, the system includes a "Microsoft Outlook® style meeting (shift) type" display configured to display recurring shift schedules and exceptions, allowing more than one shift schedule to be configured for a given day or desired time period. In some embodiments, the system enables more than one overlapping shift to be configured for a shift timeline. In some embodiments, shift exceptions are embedded inside the shift schedules which results in shift schedules that are visually similar to overlapping meeting schedules in Microsoft Outlook®. Microsoft Outlook® is referenced as a visual aid herein, but the functionality between the Microsoft Outlook® and the system described herein are not related. In some embodiments, the most recent schedule having the latest start effective (start_eff) datetime is used. In some embodiments, when the most recent schedule ends (i.e., the end_eff is older than the current datetime), then the next most recent schedule is picked up. In some embodiments, the Shift_to_go table is eliminated as there is no need to constantly delete and regenerate future shifts in the table, which saves computer resources and execution time. In some embodiments, the system includes a "shift_history" table configured to hold any comments that are applicable for a shift schedule.

In some embodiments, shift schedules are not limited to 8 hour schedules. In some embodiments, shift schedules can be any one or more of the following, as non-limiting examples:

Recurring for a specific day each week, perpetually.

Recurring for a specific day on a time range, for example, overriding schedule from October 4$^{th}$ to October 31$^{st}$ for 4 weeks.

Recurring schedule that can also span more or less than a day, covering an entire weekend, for example.

A one-off schedule, for example, a 0 shift schedule with a starting time of December 25$^{th}$ and ending time of December 31$^{st}$, where the entire duration (from December 25$^{th}$ to December 31$^{st}$) will be on shift 0.

Figure 2:
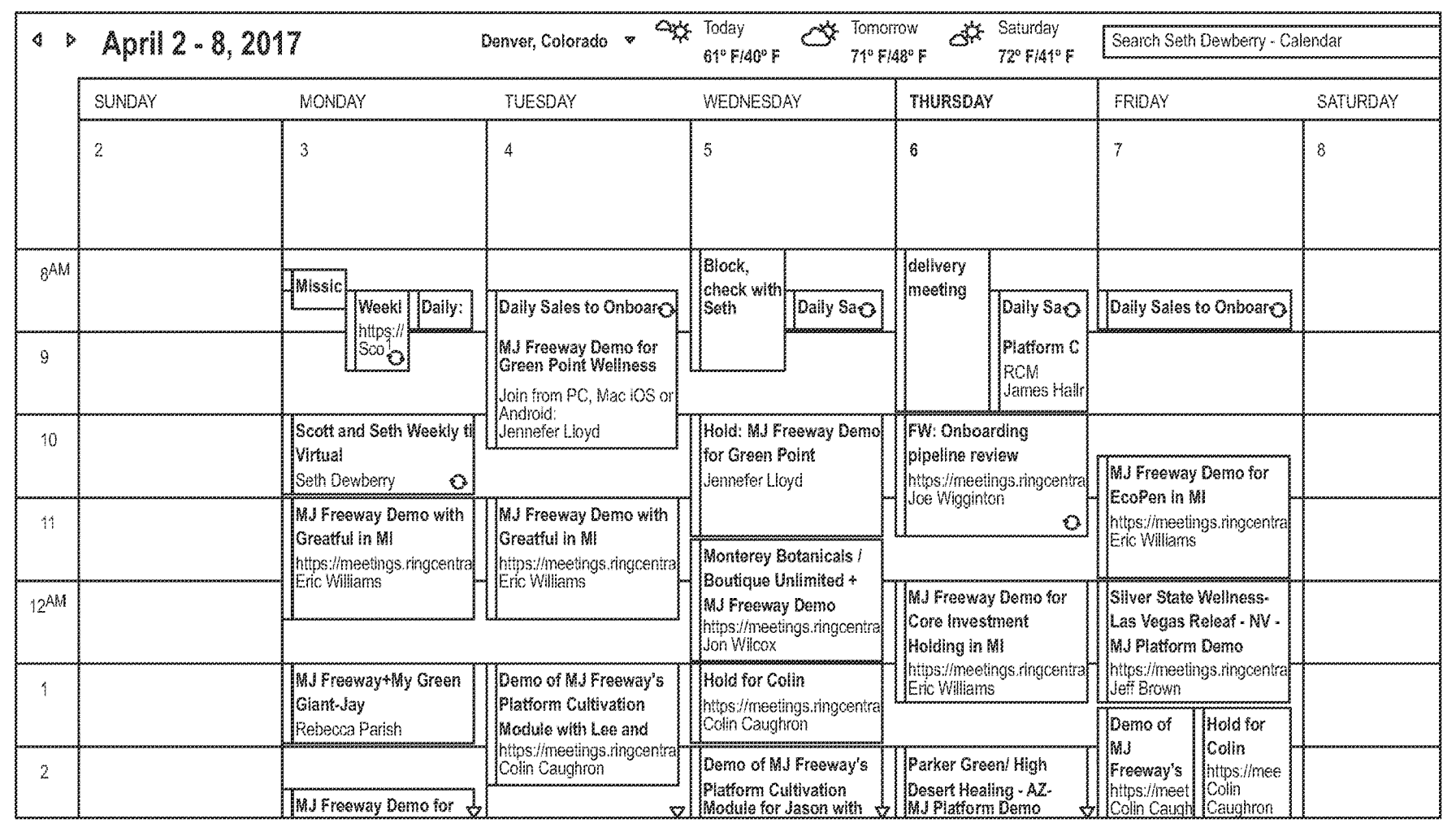

FIG. 2 shows an example screenshot of overlapping meeting schedules in Microsoft Outlook® as a visual aid. In some embodiments, the system is configured to display one or more schedules in Microsoft Outlook®. FIG. 2 does not represent how the shifts will be configured in the MES system disclosed herein but is meant to illustrate how overlapping shifts can be assigned to an entity.

In some embodiments, the system includes one or more of the following database table parameters:

In some embodiments, all the tables include one or more of the housekeeping fields (last_edit_comment, last_edit_by, and last_edit_at).

In some embodiments, if the unique identifier is not part of a primary key, then row_id is added to that table.

In some embodiments, the times configured in the shift schedule table (shift templates) are processed in entity's local time zone. For example, when the shift template of start time 6:00 am is assigned to Entity 1 in East Coast and Entity 2 in West Coast, they will have their shift schedules processed in their local times according to some embodiments. In some embodiments, a 6 am shift will be processed at 6 am local to Eastern Time for Entity 1. In some embodiments, a 6 am shift will be processed at 6 am local to Pacific Time for Entity 2.

Figure 3:
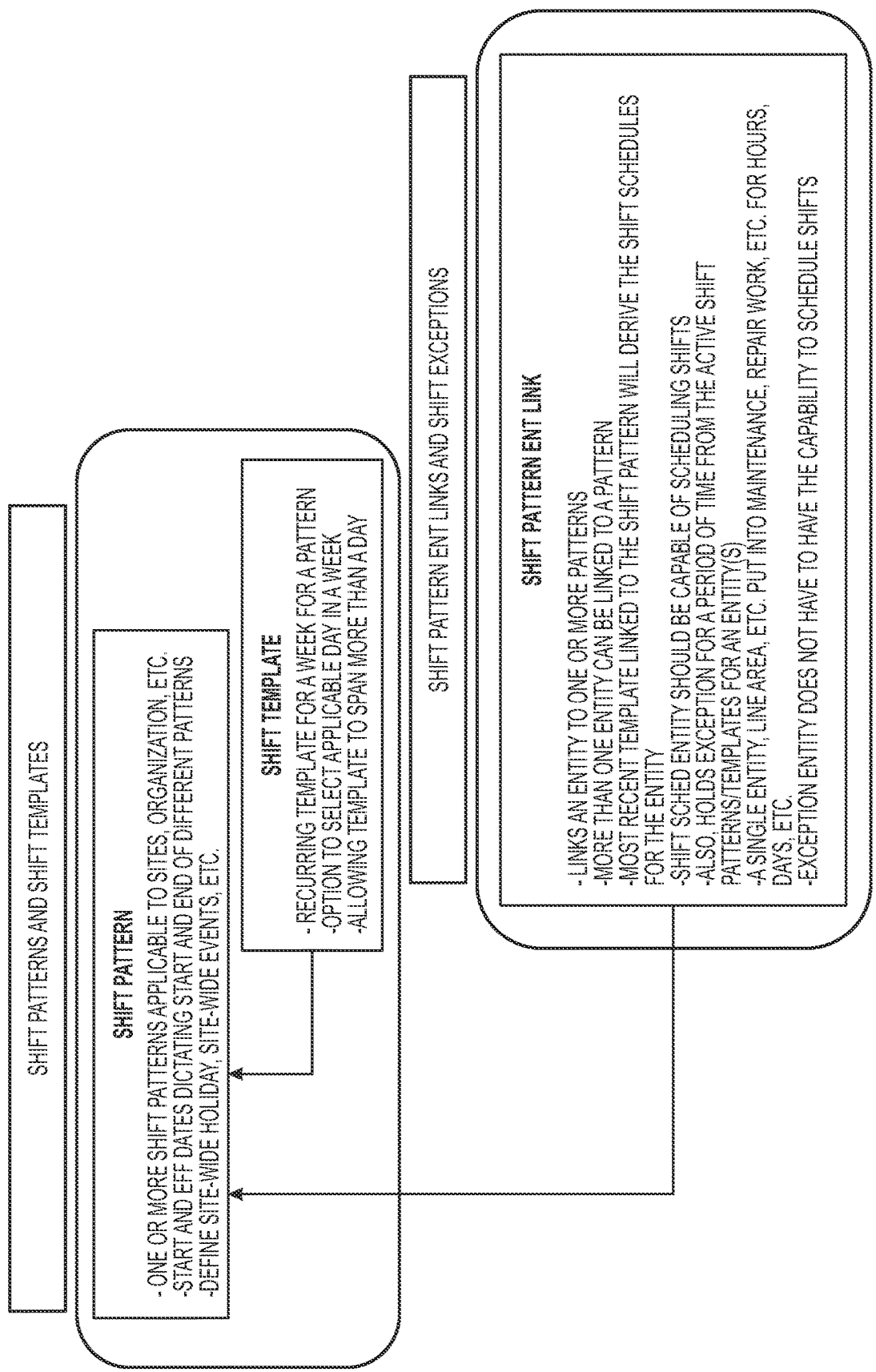

FIGS. 3 and 4 depict various table structures and relationships according to some embodiments. In some embodiments, the system includes one or more of the following table structures and relationships:

shift_history (added new columns).

Shift (Schedule) Pattern: A pattern that that dictates how the shifts are applicable throughout the organization, site, etc.

Shift (Schedule) Template: A template that indicates how the shifts are repeated for a pattern in a week.

Shift (Schedule) Pattern Entity Link: This holds a link between a pattern and an entity, resulting in many-to-many relationships between them, and holds an exception for a single entity, line, etc. from the regular shift pattern/template defined at the organization level. In some embodiments, the exception schedule can be related to line maintenance, entity maintenance, etc. In some embodiments, this exception schedule is configured to put the entire line, area, or entity, etc. in a no shift configuration for a period of time. In some embodiments, the exception entity should be an entity that is downstream to the entity from which the shift schedules are derived.

FIGS. 5-7 illustrate a shift pattern table according to some embodiments. In some embodiments, the purpose of the shift pattern table is to hold shift patterns that are applicable to entities at site level for entities that can schedule shifts, organization, etc. which is propagated to all entities downstream. In some embodiments, the system includes at least one or more of 3 types of shift patterns that can be configured at site level that are applicable to all the entities downstream:

A pattern can have regular shift schedules for a fixed period of time, or the schedules can be perpetual.

A pattern can override an existing shift schedule for a fixed period of time.

A pattern can represent a holiday, site wide event, etc. schedule for a fixed period of time In some embodiments, the shift pattern table is a table that includes the metadata of a shift pattern. In some embodiments, pattern id input field is a primary key. In some embodiments, pattern name is unique. In some embodiments, start eff local is unique.

FIGS. 8-10 show sections of a shift template table according to some embodiments. In some embodiments, the purpose of the shift template table is to hold shift templates/schedules that are repeated each week for a period of time. In some embodiments, the start day of the week (Sunday) is represented as 0. In some embodiments, the start day of the week (Sunday) is represented as 1 to align with Microsoft Outlook® scheduling configurations. In some embodiments, end day span is only applicable to the end time. In some embodiments, end day span cannot be more than 7 days (allowable values are 0-7) in order to have a recurring schedule that does not extend more than a week.

In some embodiments, there are at least two options for the shift_sched table structure. In some embodiments, the start day will not be part of the primary keys in if option 2.

In some embodiments, option 1 includes Pattern Id+Start Day+Start Time being the primary key (unique). In some embodiments, option 1 includes the template shift schedules being configured for each day and shift. In some embodiments, option 1 results in a lot more data in the database that the runtime must deal with than option 2. FIG. 8 illustrates an example table structure output based on the schedule input fields in one or more tables.

In some embodiments, option 2 includes a different table structure. In some embodiments, Pattern Id+Start Time+Shift ID is a unique primary key. In some embodiments, the template shift schedules do not have to be configured for each shift. In some embodiments, the shift templates are configured once and are assigned to a weekday to which the template shifts are applicable. In some embodiments, option 2 results in significantly less data in the table as compared to option 1. FIG. 9 a schedule output according to some embodiments.

FIG. 10 shows a Table Structure for demonstration purposes using option 2 for easy visualization of data. In some embodiments, the difference between option 1 and option 2 is how the start day is used. In some embodiments, option 1 has shift templates for each day and shift. In some embodiments, option 2 has Boolean columns for a shift indicating whether that template is applicable for a particular weekday or not.

FIG. 11 depicts a new Shift Pattern Ent Link Table according to some embodiments. In some embodiments, the purpose of this table is to link the shift templates (pattern) to one or more entities. In some embodiments, this table holds many-to-many relationship between the pattern and entity. In some embodiments, Shift Sched Ent Id+Ent Id+Pattern ID is the primary key. In some embodiments, shift schedules are normally processed using the entity that can schedule shifts. In some embodiments, the downstream entities from the schedulable entity inherit shifts from the ancestor that schedule shifts. In some embodiments, without having the ancestor entity identified that can schedule shifts, it could be become complicated in runtime code when overriding schedules.

In some embodiments, Ent Id denotes the entity that is configured to be on a specific schedule. In some embodiments, this is the entity that is downstream from the "shift sched ent id" where the shifts are inherited from. In some embodiments, the shift sched ent_id and ent_id can also be the same when the site, organization, etc. is put under an exception schedule or they are configured for a repetitive schedule.

FIG. 12 shows a modified table structure for a shift history table according to some embodiments. In some embodiments, the table includes 3 columns to hold additional context information. In some embodiments, pattern ID is added to this table to identify the pattern that was used to derive the shift schedule. In some embodiments, two new comments fields are added to this table.

In some embodiments, the system is configured for runtime shift scheduling and shift exception handling. In some embodiments, Shift schedules can be recurring or a one-off schedule. In some embodiments, at a given point of time, the pattern associated with a schedule with the most recent start_eff datetime and the end time in the future is considered for shift change. In some embodiments, if the most recent pattern does not have shift schedules for weekdays, then those days are set to shift 0, even if the older patterns had shift schedules. In some embodiments, when a pattern overrides with shift schedules, only the overridden days (days that are selected) are applicable for overriding the existing shifts. In some embodiments, the unselected weekdays from the shift schedule are ignored. In some embodiments, even if there are conflicting, overlapping, etc., shift patterns, the datetime that has the most recent (and having the end time as null or in the future) is considered as the effective shift pattern.

In some embodiments, the additive shift exceptions are treated just like any other shift schedule, except that the unconfigured days are not put into shift 0, rather that the unconfigured times are just ignored. In some embodiments, the subtractive shift exceptions are treated as one-off schedule for the site entity (and its descendants) or can be assigned to a specific single entity.

FIG. 13 shows examples of shift schedules and shift exceptions including an entity setup according to some embodiments. In some embodiments, shifts are determined local to the entity's time zone, and their respective UTC times are adjusted based on the local time of the shift.

FIGS. 14 and 15 show examples of regular shift schedules according to some embodiments. In some embodiments, the purpose of these example tables is to demonstrate how regular shift templates are processed by the MES. In some embodiments, shift templates are configured for Mon, Tue, Wed from 6 am-2 pm local time, and no shifts on the remaining days. In some embodiments, the remaining times in a week are in shift 0. In some embodiments, with regard to shift pattern, pattern ID is the primary key, and pattern name+start eff local is unique.

FIGS. 16 and 17 demonstrate how shift templates are processed when a new (most recent) pattern becomes effective and how that overrides the old patterns. In some embodiments, the new pattern overrides the existing pattern. In some embodiments, the new pattern has fewer shift schedules than the older pattern. In some embodiments, the unconfigured days are put into shift 0. In some embodiments, the entity (or site) that follows the old pattern will continue to follow the old pattern because the new pattern is not linked to the second entity.

FIGS. 18 and 19 demonstrate how additive patterns/templates override the existing/regular shift schedules according to some embodiments. In some embodiments, this example follows the same shift schedules as described in the previous example, but the shift is extended by 1 hour for 2 weeks (on 2 Tuesdays). In some embodiments, the days that are not configured for pattern 3 (for example, Sun, Mon, Wed, Thu, Fri, Sat) are not put into 0 shift, rather they are left out to follow the regular shift schedules.

FIGS. 20 and 21 demonstrate how holiday shift patterns (recurring is false and additive is false) are processed by an MES. In some embodiments, the holiday schedule defined at the site/organization level is applicable to all entities that link to this pattern.

FIGS. 22 and 23 show a single entity maintenance (subtractive) exception schedule according to some embodiments. In some embodiments, the purpose of this example is to demonstrate how a maintenance schedule is processed by an MES. In some embodiments, this example demonstrates a single entity that goes into no shift to perform the repair work during that period, thereby processing an exception schedule from the standard set of patterns defined at the site, organization level.

FIGS. 24 and 25 depict a site/line entity maintenance (subtractive) exception schedule according to some embodiments. In some embodiments, the purpose of this example is to demonstrate how a maintenance schedule for a site/line entity is processed by an MES. In some embodiments, the site entity (Entity: 1 in this example) is put into an exception schedule for 2 days for maintenance activities on all entities in this site. In some embodiments, this site entity and all of its descendants (till the next entity in downstream that has can_sched_shifts set to true) is put under shift 0 for maintenance. In some embodiments, this maintenance schedule is considered an exception schedule from the patterns defined at the site/organization level.

In some embodiments, the system includes one or more parameters. In some embodiments, table parameters and/or changes to MES systems that include one or more of:
  New "shift_pattern" table
  New shift_template table with new table structure
  New shift_pattern_ent link table
  Modifying shift_history table adding new columns
  Removing/dropping the following tables: shift_to_go, shift_exc
  Modifying SP logic to accommodate the new schema structure
  Modifying upgrade script to populate current data into new schema structure
  S-API changes/S-API Functional Test Changes
  DB Fit Tests
  Test Scripts: Reliable Data Script for db fit test and S-API test
  PSR scripts
  SQL Server 2016 requirements In some embodiments, the system includes SP changes/dependencies. In some embodiments, there are about 50 to 60 stored procedures creating/processing shift schedules. In some embodiments, of those stored procedures, perhaps, only about 10-15 are useful, meaning many should be modified to use the new table structure. In some embodiments, the shift schedules become simple with this type of configuration. In some embodiments, the most recent shift schedule is the active schedule, so there is no need to do any complex processing that is performed in several SPs. In some embodiments, the bulk of stored procedures using shift_to_go tables can be safely removed since the logic on these stored procedures will no longer be relevant to shift processing. In some embodiments, the system includes covering views for shift_to_go tables returning similar data that used to return before. In some embodiments, changes include removing DoPastShiftChanges and CreateScheduleShifts.

In some embodiments, user interface requirements include one or more of the following:
  Configure the shift pattern with the pattern disabled (i.e., enabled=false).
  Configure shift templates.
  Configure shift pattern ent link.
  Enable the shift pattern (i.e., enabled=true). In some embodiments, when the enable flag is set to true after all the configuration is complete, the MES Service will start processing the shift schedules for the entity. However, if the pattern is enabled without having adequate configurations, there may be many shift changes in between resulting unnecessary shift data in the database according to some embodiments.

FIGS. 26-30 show example screenshots from AVEVA's Insight® Performance UI according to some embodiments.

FIG. 31 illustrates a computer system 410 enabling or comprising the systems and methods in accordance with some embodiments of the system. In some embodiments, the computer system 410 can operate and/or process computer-executable code of one or more software modules of the aforementioned system and method. Further, in some embodiments, the computer system 410 can operate and/or display information within one or more graphical user interfaces (e.g., HMIs) integrated with or coupled to the system.

In some embodiments, the computer system 410 can comprise at least one processor 432. In some embodiments, the at least one processor 432 can reside in, or coupled to, one or more conventional server platforms (not shown). In some embodiments, the computer system 410 can include a network interface 435a and an application interface 435b coupled to the least one processor 432 capable of processing at least one operating system 434. Further, in some embodiments, the interfaces 435a, 435b coupled to at least one processor 432 can be configured to process one or more of the software modules (e.g., such as enterprise applications 438). In some embodiments, the software application modules 438 can include server-based software and can operate to host at least one user account and/or at least one client account and operate to transfer data between one or more of these accounts using the at least one processor 432.

With the above embodiments in mind, it is understood that the system can employ various computer-implemented operations involving data stored in computer systems. Moreover, the above-described databases and models described throughout this disclosure can store analytical models and other data on computer-readable storage media within the computer system 410 and on computer-readable storage media coupled to the computer system 410 according to various embodiments. In addition, in some embodiments, the above-described applications of the system can be stored on computer-readable storage media within the computer system 410 and on computer-readable storage media coupled to the computer system 410. In some embodiments, these operations are those requiring physical manipulation of physical quantities. Usually, though not necessarily, in some embodiments these quantities take the form of one or more of electrical, electromagnetic, magnetic, optical, or magneto-optical signals capable of being stored, transferred, combined, compared and otherwise manipulated. In some embodiments, the computer system 410 can comprise at least one computer readable medium 436 coupled to at least one of at least one data source 437a, at least one data storage 437b, and/or at least one input/output 437c. In some embodiments, the computer system 410 can be embodied as computer readable code on a computer readable medium 436. In some embodiments, the computer readable medium 436 can be any data storage that can store data, which can thereafter be read by a computer (such as computer 440). In some embodiments, the computer readable medium 436 can be any physical or material medium that can be used to tangibly store the desired information or data or instructions and which can be accessed by a computer 440 or processor 432. In some embodiments, the computer readable medium 436 can include hard drives, network attached storage (NAS), read-only memory, random-access memory, FLASH based memory, CD-ROMs, CD-Rs, CD-RWs, DVDs, magnetic tapes, other optical and non-optical data storage. In some embodiments, various other forms of computer-readable media 436 can transmit or carry instructions to a remote computer 440 and/or at least one user 431, including a router, private or public network, or other transmission or channel, both wired and wireless. In some embodiments, the software application modules 438 can be configured to send and receive data from a database (e.g., from a computer readable medium 436 including data sources 437a and data storage 437b that can comprise a database), and data can be received by the software application modules 438 from at least one other source. In some embodiments, at least one of the software application modules 438 can be configured within the computer system 410 to output data to at least one user 431 via at least one graphical user interface rendered on at least one digital display.

In some embodiments, the computer readable medium 436 can be distributed over a conventional computer network via the network interface 435a where the system embodied by the computer readable code can be stored and executed in a distributed fashion. For example, in some embodiments, one or more components of the computer system 410 can be coupled to send and/or receive data through a local area network ("LAN") 439a and/or an internet coupled network 439b (e.g., such as a wireless internet). In some embodiments, the networks 439a, 439b can include wide area networks ("WAN"), direct connections (e.g., through a universal serial bus port), or other forms of computer-readable media 436, or any combination thereof.

In some embodiments, components of the networks 439a, 439b can include any number of personal computers 440 which include for example desktop computers, and/or laptop computers, or any fixed, generally non-mobile internet appliances coupled through the LAN 439a. For example, some embodiments include one or more of personal computers 440, databases 441, and/or servers 442 coupled through the LAN 439a that can be configured for any type of user including an administrator. Some embodiments can include one or more personal computers 440 coupled through network 439b. In some embodiments, one or more components of the computer system 410 can be coupled to send or receive data through an internet network (e.g., such as network 439b). For example, some embodiments include at least one user 431a, 431b, is coupled wirelessly and accessing one or more software modules of the system including at least one enterprise application 438 via an input and output ("I/O") 437c. In some embodiments, the computer system 410 can enable at least one user 431a, 431b, to be coupled to access enterprise applications 438 via an I/O 437c through LAN 439a. In some embodiments, the user 431 can comprise a user 431a coupled to the computer system 410 using a desktop computer, and/or laptop computers, or any fixed, generally non-mobile internet appliances coupled through the internet 439*b*. In some embodiments, the user can comprise a mobile user 431*b* coupled to the computer system 410. In some embodiments, the user 431*b* can connect using any mobile computing 431*c* to wireless coupled to the computer system 410, including, but not limited to, one or more personal digital assistants, at least one cellular phone, at least one mobile phone, at least one smart phone, at least one pager, at least one digital tablets, and/or at least one fixed or mobile internet appliances.

The subject matter described herein are directed to technological improvements to the field of Manufacturing Execution Systems by enhancing scheduling capabilities. The disclosure describes the specifics of how a machine including one or more computers comprising one or more processors and one or more non-transitory computer readable media implement the system and its improvements over the prior art. The instructions executed by the machine cannot be performed in the human mind or derived by a human using a pen and paper but require the machine to convert process input data to useful output data. Moreover, the claims presented herein do not attempt to tie-up a judicial exception with known conventional steps implemented by a general-purpose computer; nor do they attempt to tie-up a judicial exception by simply linking it to a technological field. Indeed, the systems and methods described herein were unknown and/or not present in the public domain at the time of filing, and they provide technologic improvements advantages not known in the prior art. Furthermore, the system includes unconventional steps that confine the claim to a useful application.

It is understood that the system is not limited in its application to the details of construction and the arrangement of components set forth in the previous description or illustrated in the drawings. The system and methods disclosed herein fall within the scope of numerous embodiments. The previous discussion is presented to enable a person skilled in the art to make and use embodiments of the system. Any portion of the structures and/or principles included in some embodiments can be applied to any and/or all embodiments: it is understood that features from some embodiments presented herein are combinable with other features according to some other embodiments. Thus, some embodiments of the system are not intended to be limited to what is illustrated but are to be accorded the widest scope consistent with all principles and features disclosed herein.

Some embodiments of the system are presented with specific values and/or setpoints. These values and setpoints are not intended to be limiting and are merely examples of a higher configuration versus a lower configuration and are intended as an aid for those of ordinary skill to make and use the system.

Furthermore, acting as Applicant's own lexicographer, Applicant imparts the explicit meaning and/or disavow of claim scope to the following terms:

Applicant defines any use of "and/or" such as, for example, "A and/or B," or "at least one of A and/or B" to mean element A alone, element B alone, or elements A and B together. In addition, a recitation of "at least one of A, B, and C," a recitation of "at least one of A, B, or C," or a recitation of "at least one of A, B, or C or any combination thereof" are each defined to mean element A alone, element B alone, element C alone, or any combination of elements A, B and C, such as AB, AC, BC, or ABC, for example.

"Substantially" and "approximately" when used in conjunction with a value encompass a difference of 5% or less of the same unit and/or scale of that being measured.

"Simultaneously" as used herein includes lag and/or latency times associated with a conventional and/or proprietary computer, such as processors and/or networks described herein attempting to process multiple types of data at the same time. "Simultaneously" also includes the time it takes for digital signals to transfer from one physical location to another, be it over a wireless and/or wired network, and/or within processor circuitry.

As used herein, "can" or "may" or derivations there of (e.g., the system display can show X) are used for descriptive purposes only and is understood to be synonymous and/or interchangeable with "configured to" (e.g., the computer is configured to execute instructions X) when defining the metes and bounds of the system.

In addition, the term "configured to" means that the limitations recited in the specification and/or the claims must be arranged in such a way to perform the recited function: "configured to" excludes structures in the art that are "capable of" being modified to perform the recited function but the disclosures associated with the art have no explicit teachings to do so. For example, a recitation of a "container configured to receive a fluid from structure X at an upper portion and deliver fluid from a lower portion to structure Y" is limited to systems where structure X, structure Y, and the container are all disclosed as arranged to perform the recited function. The recitation "configured to" excludes elements that may be "capable of" performing the recited function simply by virtue of their construction but associated disclosures (or lack thereof) provide no teachings to make such a modification to meet the functional limitations between all structures recited. Another example is "a computer system configured to or programmed to execute a series of instructions X, Y, and Z." In this example, the instructions must be present on a non-transitory computer readable medium such that the computer system is "configured to" and/or "programmed to" execute the recited instructions: "configure to" and/or "programmed to" excludes art teaching computer systems with non-transitory computer readable media merely "capable of" having the recited instructions stored thereon but have no teachings of the instructions X, Y, and Z programmed and stored thereon. The recitation "configured to" can also be interpreted as synonymous with operatively connected when used in conjunction with physical structures.

It is understood that the phraseology and terminology used herein is for description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The previous detailed description is to be read with reference to the figures, in which like elements in different figures have like reference numerals. The figures, which are not necessarily to scale, depict some embodiments and are not intended to limit the scope of embodiments of the system.

Any of the operations described herein that form part of the invention are useful machine operations. The invention also relates to a device or an apparatus for performing these operations. The apparatus can be specially constructed for the required purpose, such as a special purpose computer. When defined as a special purpose computer, the computer can also perform other processing, program execution or routines that are not part of the special purpose, while still being capable of operating for the special purpose. Alternatively, the operations can be processed by a general-purpose computer selectively activated or configured by one or more computer programs stored in the computer memory, cache, or obtained over a network. When data is obtained over a network the data can be processed by other computers on the network, e.g., a cloud of computing resources.

The embodiments of the invention can also be defined as a machine that transforms data from one state to another state. The data can represent an article, that can be represented as an electronic signal and electronically manipulate data. The transformed data can, in some cases, be visually depicted on a display, representing the physical object that results from the transformation of data. The transformed data can be saved to storage generally, or in particular formats that enable the construction or depiction of a physical and tangible object. In some embodiments, the manipulation can be performed by a processor. In such an example, the processor thus transforms the data from one thing to another. Still further, some embodiments include methods can be processed by one or more machines or processors that can be connected over a network. Each machine can transform data from one state or thing to another, and can also process data, save data to storage, transmit data over a network, display the result, or communicate the result to another machine. Computer-readable storage media, as used herein, refers to physical or tangible storage (as opposed to signals) and includes without limitation volatile and nonvolatile, removable and non-removable storage media implemented in any method or technology for the tangible storage of information such as computer-readable instructions, data structures, program modules or other data.

Although method operations are presented in a specific order according to some embodiments, the execution of those steps do not necessarily occur in the order listed unless explicitly specified. Also, other housekeeping operations can be performed in between operations, operations can be adjusted so that they occur at slightly different times, and/or operations can be distributed in a system which allows the occurrence of the processing operations at various intervals associated with the processing, as long as the processing of the overlay operations are performed in the desired way and result in the desired system output.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

We claim:

1. A system for executing schedules within a manufacturing execution system (MES) comprising:
 a manufacturing execution system (MES) configured to monitor, control, and/or create reports about a status of one or more entities within an industrial process;
 wherein the MES comprises a scheduling module configured to generate one or more schedules for the one or more entities;
 one or more computers comprising one or more processors and one or more non-transitory computer readable media, the one or more non-transitory computer readable media having program instructions stored thereon that when executed cause the scheduling module to:
  generate, by the one or more processors, a schedule pattern table;
  generate, by the one or more processors, a schedule template table;
  generate, by the one or more processors, an entity link table;
  link, by the one or more processors, the schedule template table and the entity link table to the schedule pattern table; and
  create, by the one or more processors, the one or more schedules based on one or more parameters defined in at least one of the schedule pattern table, the schedule template table, and the entity link table.

2. The system of claim 1,
 wherein the schedule pattern table is configured to enable a user to define how schedule patterns are applied;
 wherein the schedule pattern table is configured to enable the user to define a pattern timeframe for a schedule pattern; and
 wherein the pattern timeframe includes a start time and an end time for the schedule pattern.

3. The system of claim 2,
 wherein the schedule template table is configured to enable the user to define timeframe divisions of the pattern timeframe; and
 wherein the schedule template table is configured to enable the user to define a pattern of days the schedule pattern is implemented.

4. The system of claim 3,
 wherein the entity link table is configured to link the one or more schedules to at least one of the one or more entities within the industrial process.

5. The system of claim 4,
 wherein the one or more non-transitory computer readable media have further program instructions stored thereon that when executed cause the scheduling module to:
  generate, by the one or more processors, overlapping patterns for a same entity;
 wherein the MES is configured to execute the overlapping patterns based on a pattern execution hierarchy; and
 wherein the pattern execution hierarchy comprises a plurality of patterns within the schedule pattern table.

6. The system of claim 5,
 wherein the scheduling module is configured to implement a priority of the overlapping patterns based on a respective pattern start time.

7. The system of claim 6,
 wherein priority of the overlapping patterns includes a first pattern comprising a first start date closest to a current date executing before a second pattern comprising a second start date before the first start date.

8. The system of claim 4,
 wherein the scheduling module is configured to assign a first time zone to one or more time inputs received for the one or more schedules based on a first location of a first entity where the one or more time inputs were entered; and
 wherein the scheduling module is configured to convert the first time zone to a second time zone based on a second location of a second entity to which the one or more scheduled are assigned; and wherein the MES is configured to execute the one or more schedules for the second entity when the one or more time inputs entered at the first location match a current time at the second location.

9. The system of claim 4, wherein the one or more non-transitory computer readable media have further program instructions stored thereon that when executed cause the scheduling module to:
generate, by the one or more processors, a graphical user interface (GUI);
display, by the one or more processors, the schedule pattern table on the graphical user interface, and
display, by the one or more processors, one or more input fields for one or more schedule pattern table inputs for the schedule pattern table on the GUI;

wherein the one or more schedule pattern table inputs include one or more of a pattern identification input, a pattern name input, a pattern start time input, a pattern end time input, a recurring input, an additive input, and an enabled input.

10. The system of claim 9, wherein the pattern of days includes one or more days of a week;

wherein a maximum number the pattern of days is 7; and wherein selection of the recurring input in the schedule pattern table configures the scheduling module to repeat the pattern of days in the in the schedule template table until a pattern end time defined by the pattern end time input in the schedule pattern table.

11. The system of claim 4, wherein the one or more non-transitory computer readable media have further program instructions stored thereon that when executed cause the scheduling module to:
generate, by the one or more processors, a graphical user interface (GUI);
display, by the one or more processors, the schedule template table on the graphical user interface, and
display, by the one or more processors, one or more input fields for one or more schedule template table inputs for the schedule template table on the GUI.

12. The system of claim 4, the one or more non-transitory computer readable media having further program instructions stored thereon that when executed cause the scheduling module to:
generate, by the one or more processors, a graphical user interface (GUI);
display, by the one or more processors, the entity link table on the graphical user interface; and
display, by the one or more processors, one or more input fields for one or more entity link table inputs for the entity link table on the GUI.

13. The system of claim 4, wherein the pattern timeframe includes the start time and the end time for the schedule pattern.

14. The system of claim 13, wherein the schedule pattern table is configured to enable the user to define a schedule pattern type; and wherein the schedule pattern type includes a recurring schedule, an additive schedule, and/or an enabled schedule.

15. The system of claim 1, wherein the MES is configured to control the one or more entities based at least in part on the one or more schedules.

* * * * *